(12) United States Patent
Mensler et al.

(10) Patent No.: US 10,987,841 B2
(45) Date of Patent: *Apr. 27, 2021

(54) DETERMINING PROCESS PARAMETER VALUES IN AN INJECTION MOULDING PROCESS

(71) Applicant: BTMT GmbH, Muehldorf am Inn (DE)

(72) Inventors: Holger Mensler, Fischbachau (DE); Josef Maertl, Goldach (DE)

(73) Assignee: BTMT GmbH, Muehldorf am Inn (DE)

( * ) Notice: Subject to any disclaimer, the term of this patent is extended or adjusted under 35 U.S.C. 154(b) by 584 days.

This patent is subject to a terminal disclaimer.

(21) Appl. No.: 15/570,760

(22) PCT Filed: Mar. 29, 2016

(86) PCT No.: PCT/EP2016/056800
§ 371 (c)(1),
(2) Date: Oct. 31, 2017

(87) PCT Pub. No.: WO2016/177512
PCT Pub. Date: Nov. 10, 2016

(65) Prior Publication Data
US 2018/0117816 A1    May 3, 2018

(30) Foreign Application Priority Data
May 6, 2015   (DE) .................. 10 2015 107 024.3

(51) Int. Cl.
*B29C 45/76*   (2006.01)
*B29C 45/77*   (2006.01)
*G05B 19/042*  (2006.01)

(52) U.S. Cl.
CPC ........ *B29C 45/766* (2013.01); *B29C 45/7693* (2013.01); *B29C 45/77* (2013.01);
(Continued)

(58) Field of Classification Search
CPC .................................................. B29C 45/7693
See application file for complete search history.

(56) References Cited

U.S. PATENT DOCUMENTS 3,977,255 A * 8/1976 Groleau .................. B29C 45/77
73/865.9
5,549,857 A * 8/1996 Kamiguchi ......... B29C 45/7693
264/328.1

(Continued)

FOREIGN PATENT DOCUMENTS

DE         602 24 967 T2   11/2008
DE    10 2008 038 930 A1    2/2010
(Continued)

OTHER PUBLICATIONS

International Search Report dated PCT/EP2016/056800; dated Jun. 9, 2016.

(Continued)

*Primary Examiner* — Galen H Hauth
(74) *Attorney, Agent, or Firm* — Studebaker & Brackett PC

(57) ABSTRACT

The invention describes a method of determining a number of process parameter values within an injection mould (1F) during an injection moulding process, which method comprises the steps of determining geometric data of the injection mould (1F) and/or of a form part (1, 1', 1") to be manufactured, determining a virtual part-specific pressure curve ($p_S$) of an injection moulding process, determining a part-specific event pattern ($M_S$) on the basis of the virtual part-specific pressure curve ($p_S$), carrying out an injection moulding process using the injection mould (1F) and determining a measured pressure curve ($p_m$) during the injection moulding process and determining a measurement event pattern ($M_m$) on the basis of the measured pressure curve ($p_m$). Process parameter values are derived on the basis of (Continued)

the virtual event pattern and the measurement event pattern. The invention further describes a corresponding process parameter value determining apparatus and an injection mould arrangement.

17 Claims, 25 Drawing Sheets

(52) U.S. Cl.
CPC .... *G05B 19/042* (2013.01); *B29C 2045/7606* (2013.01); *B29C 2945/76006* (2013.01); *B29C 2945/76913* (2013.01); *G05B 2219/2624* (2013.01)

(56) References Cited

U.S. PATENT DOCUMENTS

| | | |
|---|---|---|
| 6,161,057 A | 12/2000 | Nakano |
| 2002/0188375 A1* | 12/2002 | Shioiri ................ B29C 45/766 700/200 |
| 2003/0062643 A1 | 4/2003 | Bulgrin et al. |
| 2004/0256755 A1 | 12/2004 | Baba et al. |
| 2005/0246146 A1 | 11/2005 | Castro et al. |
| 2012/0059637 A1 | 3/2012 | Yu |

FOREIGN PATENT DOCUMENTS

| | | |
|---|---|---|
| DE | 10 2014 014 172 A1 | 4/2015 |
| JP | H09-272145 A | 10/1997 |
| WO | 2010/017940 A1 | 2/2010 |

OTHER PUBLICATIONS

Michaeli et al.; Selective Injection Moulding Machine Selling Using Simulation Result, part 1; Plastverarbeiter; Aug. 1994; pp. 30-34; vol. 45; No. 8; Heidelberg, Germany.

Michaeli et al.; Selective Injection Moulding Machine Selling Using Simulation Result, part 2; Plastverarbeiter; Sep. 1994; pp. 40-48; vol. 45; No. 9; Heidelberg, Germany.

* cited by examiner

DETERMINING PROCESS PARAMETER VALUES IN AN INJECTION MOULDING PROCESS

The invention describes a method of determining a number of process parameter values inside an injection mould (also referred to as a tool in the following) during an injection moulding process. Such process parameter values can be, for example, certain process indicators such as the position of a flow front or the flow front velocity of the melt within the mould during the injection moulding procedure, but also further machine-independent process parameters such as viscosity, shear stress, etc.

Generally, during an injection moulding procedure, the injection moulding arrangement is controlled on the basis of a pressure curve. To this end, a pressure signal is generally recorded within an injection mould machine with respect to time or screw position, for which purpose a measuring sensor may be used and which may be arranged at the end of the screw, close to the nozzle through which the injection mould material or the melt is injected into the form. Alternatively or in addition, the pressure may be measured indirectly, for example via the hydraulic pressure of an injection cylinder or via the current consumption, torque etc. when an electrical motor is used. The aim is then to regulate the injection process using these curves, for example to control the machine so that the curve remains within a given envelope, by defining a target pressure signal or at least a certain maximum pressure for each time instant.

In order to monitor or control the quality even better on the one hand, and on the other hand to be able to change injection moulding machines with a certain tool, for example when production is being relocated, it would be desirable to be able to determine machine-independent measurement indicators or process parameter values that are characteristic for the injection mould process in that tool. To this end, pressure sensors and/or temperature sensors may be arranged directly within the cavity of the injection mould. Using such a sensor, it is possible to determine the time instant at which the melt front (also referred to as flow front) reaches the sensor. If several such points are known in the tool, the flow front rate can be determined. From this, the viscosity, shear velocity and shear stress can in turn be calculated for that injection mould material in that tool. If the injection moulding machine is then changed, these values can be used again in principle in order to optimise the injection moulding procedure with that tool in the new machine. A disadvantage is that each tool or each cavity in the tool must be equipped with such sensors, making such tools extremely expensive.

In view of this state of the art, it is an object of the invention to provide a more straightforward and economical method of determining a number of process parameter values in an injection moulding procedure within an injection mould, as well as a corresponding facility.

The object of the invention is achieved by a method, and also by a process parameter value determining arrangement.

In the inventive method, geometry data are first determined for the injection mould and/or for a form part that is to be manufactured in that injection mould. It is irrelevant whether the geometry data of the form part or the injection mould are used. If geometry data of the injection mould are used, these are of course the geometry data of the cavity in the injection mould, and therefore ultimately also the geometry data of the form part, since the geometry data of the cavity are only slightly larger than those of the form part. For this reason, the geometry data of the injection mould can be converted into geometry data of the form part, and vice versa.

Using the geometry data, a (theoretical) virtual form part-specific pressure curve is determined. As will be explained below, this can be done using an analytical computation or numerically, for example by means of a simulation. This part-specific pressure curve then describes the pressure over a "virtual" time representing the injection time or machine time with respect to a specific start time and/or a (virtual) actuator position. This start time can be defined, for example, as the time at which the melt front enters the injection channel or passes the form part gate interface in the cavity, etc. An actuator position can for example represent the position of a screw or other actuator in the injection moulding arrangement that injects into the injection mould.

On the basis of this virtual part-specific pressure curve, a part-specific event pattern is determined. This part-specific event pattern comprises a plurality of singular virtual events that are linked to characteristic event locations of the form part geometry. At least one relative time information and/or one virtual actuator position as well as at least one position datum are assigned to each of the virtual events. In principle, the time information also represents the position of the actuator of the injection moulding arrangement that forces the injection material from the injection moulding arrangement into the injection mould. Since the actuator is controlled, and every position of the actuator corresponds to a specific time, assigning the actuator position to an event applies equally to the corresponding time.

A position datum is a position specification that defines the position of a melt front or flow front of the injection mould material in the injection mould. It may be a simple position specification, for example when only a one-dimensional flow is to be considered. In principle, it may be several position specifications that define where the melt front is within the tool cavity, for example all position specifications of a multitude of points on the melt front, for example the nodes on the melt front in the case of an FEM simulation. The time information and the position datum can also be recorded together, along with further parameters as the case may be, in an event vector for each individual event.

A "singular" event is to be understood as a single temporal event that occurs when the melt front reaches a certain characteristic event location inside the cavity. Generally, along the flow path in the cavity of the form, there are changes in the form part geometry, particularly to the flow path cross-section, for example constrictions, expansions, edges, corners, curves, flow obstructions etc. As the melt flows past, these significant geometry changes result in a significant alteration in behaviour regarding the pressure curve. For this reason, such locations are referred to as "event locations", and the melt front's arrival at or passing of such an event location is referred to as a "singular event". Such singular events can occur in the form of closely-arranged event groups comprising a number of consecutive events that occur at very short time intervals or at very small actuator position changes. The sequence of events occurring along the flow path forms an event pattern that is characteristic for the injection mould as a kind of "fingerprint". Of course, when for example the form comprises several flow paths, it is possible to combine several partial event patterns to give a total event pattern, wherein each event pattern can be assigned to a specific flow path. Determining a part-specific event pattern in the context of the invention can therefore mean obtaining or determining a total event pattern or simply determining one or more partial event patterns along certain flow paths.

Furthermore, in the inventive method, a real injection moulding procedure is carried out using the respective injection mould. During this injection moulding procedure, a measurement pressure curve is determined. This measurement pressure curve can be obtained for conventional injection mould arrangements directly in the machine, for example by means of a pressure sensor in the screw chamber or by means of an indirect pressure measurement of the hydraulic pressure at the injection cylinder, by measuring parameters of the injection motor etc., by strain gauges or other elements. In principle it is also possible to use additional measurement sensors in the injection mould, however this is not necessary.

Similar to determining the part-specific event pattern on the basis of the virtual part-specific pressure curve, a measurement event pattern can now be determined on the basis of this real measurement pressure curve after carrying out the injection moulding procedure. The measurement event pattern comprises a plurality of singular measurement events to which are assigned at least one time information and/or actuator position, i.e. for example a specific injection time or machine time since the start of the injection moulding procedure, or a similar starting point. Here also, the injection time or machine time and/or the actuator position can be recorded for that measurement event together with further parameters in an event vector.

Virtual events of the part-specific event pattern are then assigned to measurement events of the measurement event pattern. As will be explained below, this can be done by comparing the event patterns or by identifying the part-specific event pattern in the measurement event pattern, or similar. It should be noted that the patterns need not necessarily be identical at this time, for example when the determined part-specific event pattern only considers a particular flow path or only certain sections of the flow path, while the measurement event pattern covers a greater range, for example including further flow paths. Equally, the absolute times between events of an event pattern need not correspond. What is important is that, like a fingerprint, characteristic events can be identified in the part-specific event pattern and in the measurement event pattern with identical order and matching relative times. The various ways of assigning virtual events of the part-specific event pattern to the corresponding measurement events of the measurement event pattern will be explained below.

The desired process parameter values can be derived on the basis of the position data, time information and/or actuator positions that were assigned to the virtual events, and from the measurement events that were matched to these virtual events. The desired process parameter values can be derived on the basis of the position data assigned to the virtual events and on the basis of the time information and/or actuator positions assigned to the measurement events that were matched to the virtual events.

In the context of the invention it is not attempted to simply adapt the pressure curves of a simulation and a real injection moulding procedure to each other and to determine the desired information. This would be possible in theory, but is extremely difficult in practice and maybe even impossible particularly in the case of complex forms. Instead, the aim is to identify a characteristic event pattern as a kind of fingerprint by means of an appropriate analysis of the measurement pressure curve in order to identify when the melt front passes certain event locations inside the injection mould. It has been shown that by analysing the pressure curves to determine the characteristic event pattern and by assigning the event patterns to each other, a very reliable mapping is made possible, simplifying the method significantly.

The order of steps described above does not have to be adhered to, for example the measurements could be recorded first, followed by a simulation. However, in most cases, calculation of the part-specific event pattern will be done first, since this can be compared again and again to the measurement event patterns.

An arrangement for determining process parameter values that can be used for the inventive method requires firstly at least a first interface for determining geometry data of the injection mould and/or form part. This interface can be a user interface through which a user may enter the necessary information, or a different interface through which for example CAD data may be entered, etc.

Furthermore, a pressure gradient determining module is required that is configured to determine a virtual part-specific pressure gradient of an injection moulding procedure on the basis of the geometry data. This may for example also be a simulation module, which for example carries out a FEM simulation to numerically determine the pressure gradient.

In addition, a (first) pattern determining unit is required, configured to determine a part-specific event pattern on the basis of the virtual part-specific pressure curve. As explained above, this part-specific event pattern comprises a plurality of singular virtual events, to each of which is assigned a relative time information and/or a virtual actuator position as well as a position information.

Also, a further interface is required at an injection moulding arrangement using that injection mould, for obtaining a measurement pressure curve during a real injection moulding procedure. This second interface can be a measurement sensor that records the pressure curve, but may equally be an interface that obtains the required measurement values or the complete curve from other measurement sensors or the machine controller.

A pattern determining unit is also required, which is configured to determine a measurement event pattern on the basis of the measurement pressure curve, whereby the measurement pressure curve comprises a plurality of singular measurement events to which at least a time information and/or an actuator position is assigned as explained above. This pattern determining unit can be the first pattern determining unit that also determines the part-specific event pattern on the basis of the virtual part-specific pressure curve. However, it can equally be a separate (second) pattern determining unit.

In addition, an assignment unit is required that is adapted to assign virtual events of the part-specific event pattern to measurement events of the measurement event pattern.

Lastly, an analysis unit is required that is configured to derive process parameter values on the basis of the position data and time information and/or actuator positions assigned to the virtual events, which are assigned to measurement events that are assigned to these virtual events.

The individual components of the process parameter value determination arrangement are preferably realised at least partially in the form of software. This applies in particular to the pressure curve determining unit, the assignment unit and the analysis unit. These components can all be realised in the form of software modules that act together on a dedicated processor unit, for example a central processing unit, or an a processor unit of an already existing controller of the injection moulding arrangement. The interfaces may also be realised completely or partially in the form of software, depending on the interface type, for example whether finished data are to be acquired from another software module or whether a user input is necessary or whether measurement data are to be acquired. Generally, it is also possible that some or all components are realised in the form of hardware, for example individual modules as FPGAs or similar. It shall be noted that the components of the process parameter value determining apparatus may also be distributed over various modules and that in particular, as already mentioned above, resources or components of already existing controllers, monitoring units or other modules of the injection moulding arrangement may be shared.

With the aid of such a process parameter value determining apparatus, it is possible to construct an injection moulding arrangement according to the invention, which comprises the usual components in addition to the process parameter values determining arrangement, specifically an injection nozzle, an actuator such as a screw or similar to force injection mould material from the nozzle into an injection mould connected to the injection moulding arrangement, as well as a control unit for controlling the actuator. The process parameter values determining arrangement can for example be partially or entirely incorporated in the control unit. It shall be noted that the expression "to control" may also be understood in the following to mean "to regulate", whereby regulation is to be understood as a type of control towards a target on the basis of feedback.

The inventive method is particularly preferably in a method of controlling an injection moulding arrangement. To this end, with the inventive method, certain process parameter values are determined, for example process characteristics mentioned above such as flow front velocity, flow front position as well as machine-independent process parameters for a first injection moulding procedure with an injection mould. The process parameter values determined in this way are then used by a controller of the injection moulding arrangement as input values, specifically as target parameter values, for a further injection moulding procedure.

The inventive method can be used particularly advantageously in a method of visualising an injection moulding procedure inside an injection mould of an injection moulding arrangement. To this end, the inventive method is applied to determine at least the position of the flow front as a function of the respective current injection time and/or actuator position. This flow front can then be virtually shown, in a display arrangement, inside a virtual injection mould and/or a virtual form part or a virtual form part geometry. To this end, the process parameter values determining arrangement or its user interface can be equipped with a suitable visualisation arrangement. The flow front position can be output preferably as an animation, for example as a video or slide-show (using individual images) or similar. In a particularly preferred embodiment of the invention, at certain points along the flow front, the user is able to enter control commands for subsequent injection moulding procedures. In other words, in the animation, e.g. video or slide-show, the user can be shown the progress of the flow front as a function of the machine time and/or an actuator position, can stop the animation at a specific point or specific image, and can enter control commands that will be assigned to the relevant injection time or actuator position. In a subsequent injection moulding procedure, control of the injection moulding arrangement or actuator will be done according to these new control commands. For example, the user could specify that the injection rate, i.e. the feed rate, is increased or reduced just when the flow front reaches or passes a certain event location.

In this way, the user is given the possibility of very quickly optimising the injection moulding procedure. For example, the user could identify potential defect locations on an initially created form part, since the individual event locations are visible on its geometry, and could enter corresponding control commands for these event locations that are linked, as explained above, to a specific injection time and/or actuator position, in order to cancel out these error locations in a subsequent injection moulding procedure. In this way, a significantly more rapid optimisation of an injection moulding procedure is possible, and wastage is avoided.

The following description discloses particularly advantageous embodiments and features of the invention, whereby features of different embodiments may be combined to arrive at further embodiments not explicitly described herein.

As far as possible, the volumetric flow is kept constant during an injection moulding procedure when determining the measurement pressure curve. Equally, the volumetric flow is preferably assumed to be constant when determining the virtual part-specific pressure curve. In this way it is ensured that the relative time intervals between events of the characteristic pattern or "fingerprint" cannot change. However, if it is considered expedient for reasons of the injection moulding procedure to adjust the volumetric flow, for example to vary the feed rate of the actuator (e.g. the screw), i.e. in the case of a variable volumetric flow during the injection moulding procedure, the determined measurement pressure curve is first converted to a fictitious, time-corrected measurement pressure curve. This is done by using information regarding the volumetric flow variations or the control information of the injection moulding arrangement during the injection moulding procedure. This time-corrected measurement pressure curve then corresponds to a measurement pressure curve as it would have been measured had the volumetric flow been kept constant over the entire duration. This fictitious, time-corrected measurement pressure curve may therefore also be regarded as a variation-corrected measurement pressure curve. The measurement pressure curve is determined on the basis of this time-corrected measurement pressure curve. This then allows the comparison or the assignment to the events in the virtual part-specific event pattern that was determined under the assumption of a constant volumetric flow. It shall be noted that it is also possible in principle to assume a variable volumetric flow during the simulation, i.e. in the case of a well-defined variable volumetric flow during the measurement, the volumetric flow could be varied during a simulation. In this case also, a comparison of the event patterns is possible. For the sake of completeness, it shall be noted that also a virtual part-specific pressure curve, determined with an assumed variable volumetric flow, can be corrected according to the measurement pressure curve or converted to a virtual pressure curve with constant volumetric flow.

As already explained above, the event locations that generally result from a change in the cavity geometry manifest as disproportionately large changes in the pressure gradients. For this reason, the virtual events of the characteristic event pattern are preferably determined on the basis of the temporal change in slope of the virtual part-specific pressure curve. Equally, the measurement events of the measurement event pattern are preferably determined on the basis of the temporal change in slope of the measurement pressure curve.

In a particularly preferred embodiment of the inventive method, the part-specific pressure curve is differentiated over time (first derivative) and the virtual events are then determined by means of a slope analysis of the differentiated part-specific pressure curve. In the same way, the measurement pressure curve can be differentiated over time, and the measurement events are determined by means of a slope analysis of the differentiated measurement pressure curve. In the context of a slope analysis, the slopes within the differentiated pressure curve are analysed. For example, whenever a particularly steep increase appears in the differentiated pressure curve, it can be determined where the tangent of the increasing slope intersects with the tangent of the section preceding that slope. This point in time can be defined as the time of the respective event. Already available software can be used to carry out the differentiation of the pressure curves and the slope analysis, for example OriginPro or Matlab. Alternatively or in addition to slope analysis, the virtual events can preferably be determined by peak analysis of the differentiated part-specific pressure curve, whereby the peak heights may also be considered. Equally, an analysis of the turning points is also possible in order to identify the virtual events.

To determine the measurement pressure curve, a plurality of measurement events are preferably determined between the time the melt enters a form part interface (referred to as a "gate") of the injection mould cavity and a termination of the form filling phase of the injection mould. The term "form filling phase" is to be understood as the interval that starts with the fill of the injection mould, i.e. at the moment when the melt front reaches the injection mould gate location up until commencement of the so-called "volumetric fill phase", i.e. until the melt front has reached the end of the flow path in the cavity, which is generally accompanied by a changeover to a pressure-regulated holding pressure phase. Because of the plurality of measurement events in the event pattern, lying within this interval, a particularly good assignment of the characteristic event pattern originally submitted is possible. In a particularly preferred embodiment of the invention, it is only that interval of the measurement pressure curve, determined during this form fill phase of the injection mould, that is considered. Accordingly, it is then sufficient to compute or to simulate only this part of the part-specific virtual pressure curve.

Of course, it is in principle also possible to use a larger range, particularly to start at an earlier time and for example to define the starting point as the time at which the flow front enters the gate, or similar.

As mentioned above, when determining the measurement pressure curve, it is possible in principle to also use measurement values from sensors inside an injection mould. However, determining the measurement pressure curve is preferably done during the injection moulding procedure by analysing measurement values and settings externally to the injection mould, i.e. using means that are generally already available in a conventional injection moulding arrangement. Measuring the measurement pressure curve is particularly preferably done exclusively using measurement values and settings externally to the injection mould, i.e. without using any measurement values from sensors arranged in the injection mould cavity.

Particularly in the case of complex form part, the virtual part-specific pressure curve is determined by means of a numerical simulation. To this end, conventional FEM simulation software can be used, for example Autodesk Moldflow, Cadmold or Moldex3D.

The assignment of virtual events of the part-specific event pattern to measurement events of the measurement event pattern may, in a preferred embodiment, be carried out with the aid of a suitable pattern recognition method, particularly an image recognition method. Pattern recognition methods are to be understood as also image registration methods or other matching methods that serve to analyse for example images and/or biometric data such as fingerprints and to assign these to other relevant images or biometric data. To this end, recourse may be taken to conventional software that may be used as a basis for other pattern recognition applications or other matching applications of fingerprints or other patterns.

In a preferred method, it is attempted to at least partially (virtually) overlay the part-specific event pattern and the measurement event pattern in an iterative process for the assigning of virtual events of the part-specific event pattern to measurement events of the measurement event pattern. To this end, between the different iteration steps, the part-specific event pattern and/or the measurement event pattern may be temporally scaled and/or offset relative to each other according to defined rules in order to achieve a fit. In addition or as an alternative, between the different iteration steps, and again according to the defined rules, virtual events of the part-specific event pattern and/or measurement events of the measurement event pattern can be eliminated in order to remove individual events for this overlay or fitting step that do not fit into the other pattern. A typical example is when the virtual part-specific event pattern was determined so that the start time was chosen to be the point at which the melt front passed the form part gate, but the measurement pressure curve includes the entry of the melt front at the gate channel as an event. In this case, the measurement event pattern would comprise several singular events before a measurement event pattern portion appears that corresponds to the part-specific virtual event pattern.

It shall be pointed out that it is also possible in principle to assign several virtual part-specific event patterns to one measurement event pattern, for example for different flow paths and/or several cavities in a complex form.

With the inventive method, various process parameter values can be determined. Particularly preferably, the process parameter values that are to be determined, or the process parameter values that were determined by the method for the real injection moulding procedure, comprise the position of the flow front as a function of the respective actual injection time and/or an actuator position. Equally preferably, the process parameter values comprise the flow front rates in the injection mould. These can then be visualised in an appropriate manner as mentioned above.

In a particularly preferred embodiment of the invention, the process parameter values also comprise machine-independent process parameter values that, up until now, can only have been determined using methods in which sensors are arranged in the cavity of the tool. These may particularly preferably be at least one of the following rheological values:

shear rate;
melt viscosity;
wall shear stress.

In a particularly preferred control method, in the case of an injection moulding procedure that delivers acceptable or at best optimal results, these values are provided as target values and assigned to the tool. If an injection moulding procedure is performed again at a later time with this tool, it can be regulated to precisely these target values, regardless of whether or not the injection moulding arrangement has been changed in the meantime, or whether other external parameters such as temperature etc. have changed. To this end, a test injection moulding procedure is predefined with certain start parameter values for the pressure to be maintained or the feed rate of the actuator etc. over time, i.e. the volumetric flow as a function of time. Then, with the aid of the inventive method, one or more of these rheological values are determined during the injection moulding procedure. Subsequently, the control parameter values can be altered at the injection moulding arrangement so that in the following injection moulding procedures, these rheological values will be achieved inside the cavity of the tool. In this way, the injection moulding procedure can be optimised must quicker than before, and unnecessary wastage can be avoided.

Other objects and features of the present invention will become apparent from the following detailed descriptions considered in conjunction with the accompanying drawings. In the drawings, like numbers refer to like objects throughout. Objects in the diagrams are not necessarily drawn to scale.

Figure 1:
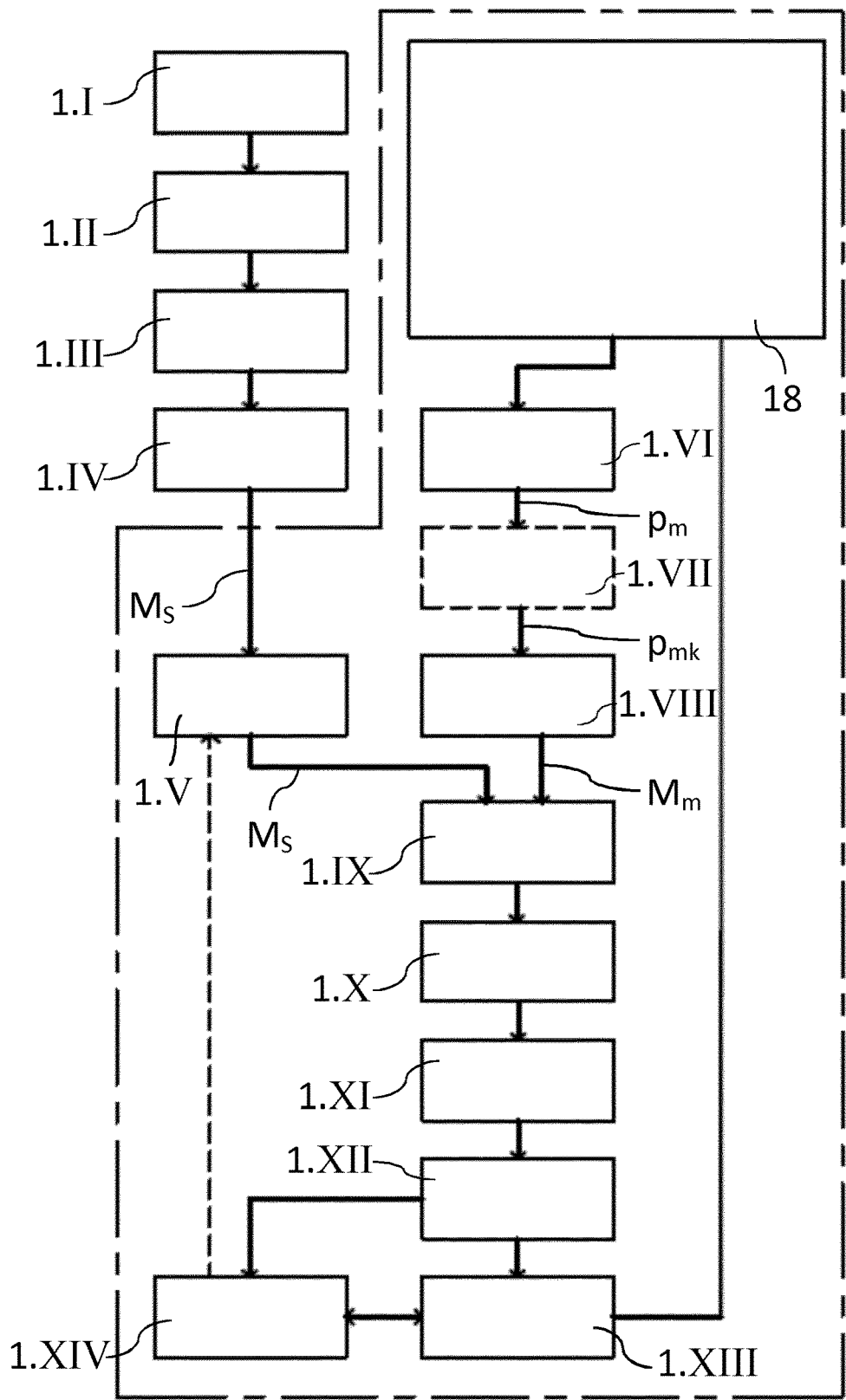
FIG. 1 is a schematic representation of an embodiment of the inventive method of determining process parameter values.

FIG. 1 shows a flow chart for a preferred embodiment of the method of determining the process parameter values. In stage 1.I, the geometry data of the moulded part or the injection mould are captured completely. For example, these can be provided in the form of a machine-readable STEP file that can be imported. In addition to the moulded part geometry, the geometry data of the gating system can be captured in stage 1.II in the same way. This need not be carried out in two distinct stages but can in principle be done in a single stage.

In stage 1.III, the virtual part-specific pressure curve (of the virtual melt or injection mould mass, therefore also referred to as "mass pressure curve", i.e. the pressure required in order to fill the cavity or the pressure determined at the section or at the gate, is calculated on the basis of these geometric data using the (virtual) injection time at constant volumetric flow of the injection mould material. In the following it will be assumed that the injection mould material is a polymer melt. The computation is preferably performed numerically using a finite-elements method (FEM).

Using suitable known software such as Autodesk Moldflow, the moulded part geometry and the geometry data of the gating system, as appropriate, can be linked and the pressure gradient during filling of the form can be calculated. Individual elements form a FEM mesh with nodes at the junctions.

The pressure required to fill the cavity can for example be calculated as follows: According to the Hagen-Poiseuille equation, $$\Delta p = \frac{12 \cdot \dot{V} \cdot \eta}{b \cdot h^3} \cdot L \tag{1}$$

where $\Delta p$ is the pressure drop to fill a flow path section of the melt channel with cross-sectional area b·h (b is width, h is height) within the cavity with flow rate flow path length L and melt viscosity n. Usually, polymer melts are pseudoplastic, i.e. the viscosity is in turn a function of shear rate and therefore also of the flow rate and temperature T. The mathematical determination of the entire pressure drop that ensues from a complete filling of the cavity can be achieved by "pacing off" the flow path of the polymer melt from the injection point to the end of the flow path (i.e. during the so-called injection phase) under constant flow rate.

Along the flow path, there will be alterations in the part geometry and the flow path cross-section. Such alterations can for example be constrictions, expansions, edges, corners, curves and flow obstructions. When the polymer melt reaches such an alteration, an "event" occurs and is registered in the pressure gradient. For this reason, these locations are referred to as "event locations" in the context of the invention.

Figure 2:
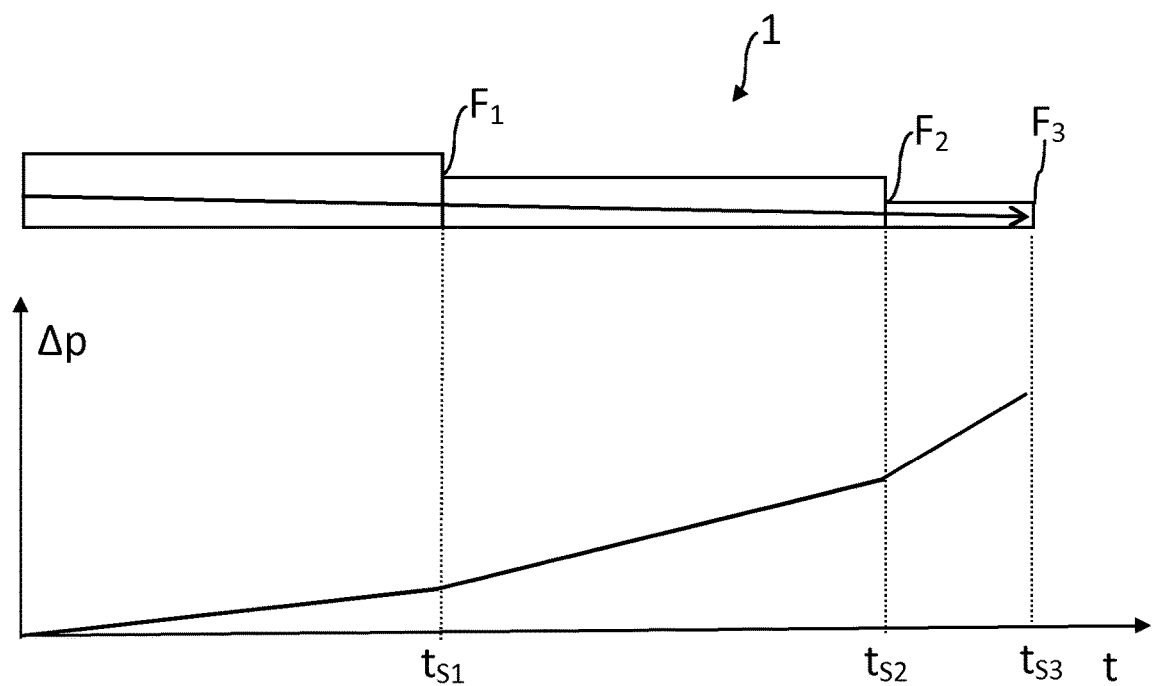
FIG. 2 is a schematic representation of a one-dimensional flow path for a stepped plate and a corresponding schematic increasing pressure curve.

The principle can best be explained with the aid of a simple example, referring to FIG. 2. In this example, the flow path describes a straight path (one-dimensional flow path) from the gate to the end along a stepped plate with two steps as moulded part 1. In such a case, it would also be possible for example to analytically determine the pressure drop. To this end, the part geometry can be broken down into calculable basic geometrical sections. These can then be computed according to equation (1).

In the upper part of FIG. 2, the geometry is shown along the straight one-dimensional flow path as it tapers from the large cross-section towards the small cross-section. The total pressure loss progression over the entire flow path and over the fill time t results from joining the pressure drops in the individual sections. Exactly three events take place along the flow path at times $t_{S1}$, $t_{S2}$, $t_{S3}$, namely exactly when the melt front reaches event locations $F_1$, $F_2$, $F_3$, at the two steps and at the end of the form. As can be seen in the lower part of FIG. 2, the slope of the pressure gradient $\Delta p$ changes with the constriction at each event location $F_1$, $F_2$.

Since the melt is largely incompressible, when the flow rate is changed at the machine, the events must take place in inverse relationship to the size of the change in order to fulfil the continuity equation. For example, if the flow rate is changed according to $$\dot{V}'=f\cdot \dot{V} \qquad (2)$$

(where f is any suitable factor), in the case of a fill process with n such events, the $i^{th}$ event will take place at location $L_i(x_i,y_i,y_i)$ and at time $$t'_i = \frac{1}{f} \cdot t_i \qquad (3)$$

It has been assumed that the position or location is not just one-dimensional but is defined in three dimensions, which is usually the case for a flow path that is not one-dimensional.

Such a purely analytical calculation over sections of the flow path can also be carried out in principle for a more complex part, for example comprising more steps, constrictions or expansions. Instead, in the case of more complex forms, in particular multi-dimensional forms, it is better to perform a numerical calculation with the aid of a FEM program. For example, if a form is injected in the middle and then fills over various flow paths, calculation of the pressure loss over each of these flow paths can be done with the aid of such an FEM program. To this end, starting at the injection point, a two- or three-dimensional fill image is generated which represents the simulated flow front path over time. The discretization density can be set by the element size of the FEM mesh. The program can then calculate pressure, pressure gradient, temperature etc. at each node over time.

Figure 3:
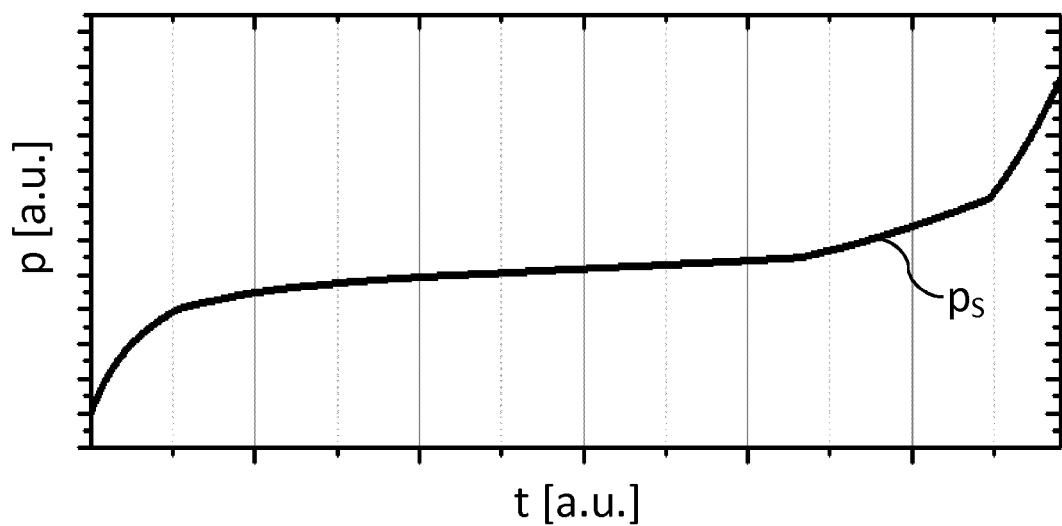
FIG. 3 shows a numerically computed pressure gradient for the stepped plate of FIG. 2 with a gating system.

As an example, FIG. 3 shows a pressure gradient $p_S$, numerically calculated with such a program. Pressure p is shown against time t in arbitrary units. Such a pressure curve can be measured directly at the injection system during an injection moulding procedure as a real pressure gradient or mass pressure gradient of the real melt or injection mass.

In the context of the inventive method, a part-specific event pattern is then determined in stage 1.IV (see FIG. 1) for the respective form part on the basis of such a calculated pressure curve. The events can be located by first differentiating the pressure curve $p_S$ with respect to time. The precision will depend on the discretization density of the numerical computation (e.g. element size) and the differentiation resolution.

Figure 4:
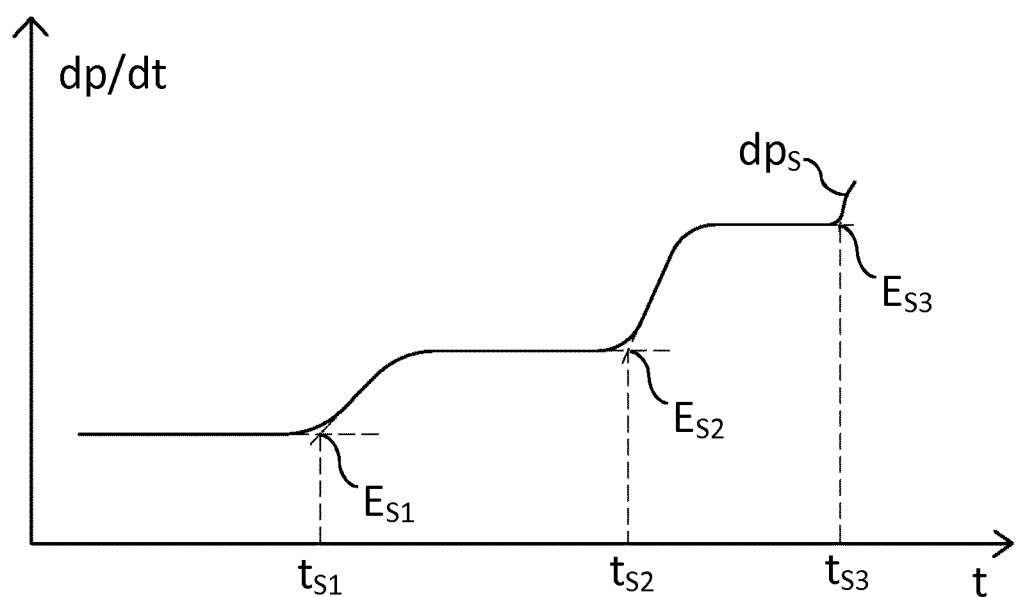
FIG. 4 shows a schematic curve of the pressure gradient of FIG. 3 differentiated over time.

FIG. 4 shows the differentiated pressure curve $dp_S$ of the pressure curve $p_S$ of FIG. 3 (again, in arbitrary units). As FIG. 4 clearly shows, the time instant of one or more of the computed events $E_{S1}$, $E_{S2}$, $E_{S3}$, that in this case match the event locations $F_1$, $F_2$, $F_3$ of a one-dimensional flow path, can be determined by slope analysis of the curve progression of the differentiated pressure gradient $dp_S$. For example, the tangents of the rising edges can be determined, and the intersections of the slope tangents with the tangents of the preceding, less steeply ascending sections can determine the time instants $t_{S1}$, $t_{S2}$, $t_{S3}$ of the three event $E_{S1}$, $E_{S2}$, $E_{S3}$. As shown here, these event time intervals correspond to relative spatial intervals of the event locations in the case of the one-dimensional flow path.

By superimposing the form part geometry, a computed position of the melt front can be assigned to each individual event $E_{S1}$, $E_{S2}$, $E_{S3}$. In a finite-element network, events can be assigned to one or more nodes that lie on or close to the melt front. Each event $E_{Si}$ can be expressed as a vector $E_{Si}$ ($t_{Si}$, $p_{Si}$, $x_{Si}$, $y_{Si}$, $z_{Si}$, $h_{Si}$) that, in addition to the event time instant $t_{Si}$, comprises further components such as the position of the melt front in all three spatial directions, the calculated pressure drop at this point, and possibly also the geometry data of the melt channel at the calculated position, for example the height $h_{s,i}$ of the channel.

By simply plotting the instants of the individual events over time, for example as dots, as will be shown later with the aid of FIG. 11, a part-specific pattern emerges, in other words an individual and distinct pattern or fingerprint for the respective form part. This pattern describes a relative temporal (and also spatial) alignment of all computed events with the progress of the polymer melt from the point of injection to the end of the flow path, and can be compressed or extended according to the respective volumetric flow rate that was assumed for the computation.

The part-specific event pattern $M_S$ can be combined with the geometry data in a parameter set or characteristics set in the form of a machine-readable file (see stage 1.V in FIG. 1) and read into the control unit (referred to in the following as machine controller) of the injection moulding arrangement. If an FEM computation was done, the parameter set can also comprise additional information such as the FEM mesh and the computed fill progression of the injection moulding procedure.

Modern injection moulding arrangements are capable of controlling settings such as temperatures, pressures and velocities within tight limits. To this end, the machine controller compares the parameter settings with the measured values and then acts on control elements that are built into the system or external to the system. Regulation is often towards a constant pressure or a constant volumetric flow, or for example to follow to a predefined volumetric flow function. For this type of control, the volumetric flow is used as target value.

Figure 5:
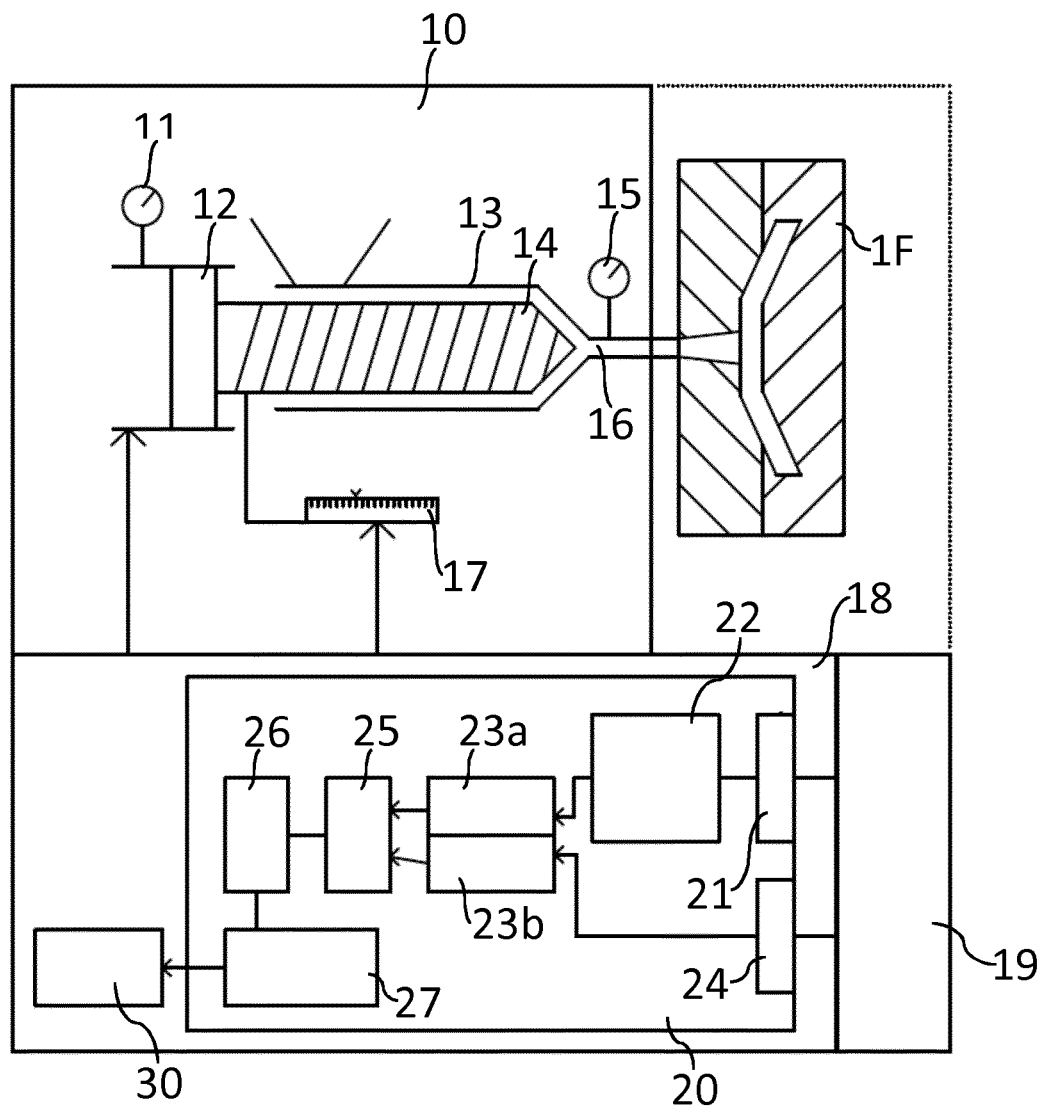
FIG. 5 is a schematic representation of an exemplary embodiment of an injection moulding arrangement according to the invention.

FIG. 1 shows the control unit 18 as a simple block from which the information is taken or to which information is given. FIG. 5 shows a simplified schematic representation of a controllable or adjustable injection moulding arrangement 10. Apart from the different control unit 18, it can be the same as a prior art injection moulding arrangement 10.

In the usual manner, this shows a cylinder 13 in which a screw 14 is arranged as actuator. Injection mould material can be introduced into the cylinder 13 by means of rotations of the screw 14. At its lower end, the screw 14 is connected to an injection piston 12 that can be moved hydraulically. Equally, an electric motor could be used for the injection. The hydraulic pressure can be measured at a measurement unit 11. When the hydraulic pressure is increased, the injection piston 12 is extended outward, thereby moving the screw 14 forwards into the cylinder 13, and injection mould material from the nozzle 16 is forced into the cavity of the injection mould 1F, which is shown here in a very simplified manner. The pressure of the polymer melt can be measured directly at the nozzle by means of a measuring sensor 15. With an additional measurement unit 17, it is possible to determine the position of the actuator 14 or the screw 14 and their velocities.

The various components and actuators are controlled by a control unit 18 that comprises a terminal or user interface 30 with a display 31 or screen (see FIG. 14), preferably in the form of a touchscreen, and possibly also a control panel 36 (with further fittings such as an adjuster, e.g. a control wheel, and a keyboard), and which, in addition to other usual components present in such a machine controller, also comprises an embodiment of the inventive process parameter value determining unit 20, of which the most relevant elements are roughly indicated. Other components of the control unit 18 and injection moulding arrangement will be known to the skilled person, and need not be explained here in detail.

The process parameter value determining unit 20 comprises a first interface 21 over which the geometry data of a form part can be provided. These data are then forwarded to a pressure gradient determining unit 22, which carries out process stage 1.III as explained above with the aid of FIG. 1, and computes a pressure gradient $p_S$ for the respective form part, for example in a FEM simulation. The pressure gradient $p_S$ can then be forwarded to an event pattern determining unit 23a, which determines the part-specific event pattern $M_S$ from the virtual pressure gradient $p_S$ according to stage 1.IV as explained above with the aid of FIG. 1.

A measurement pressure curve $p_m$ can be acquired through a further interface 24, for example by a read-out of sensor 11 that measures hydraulic pressure, or directly by a read-out of sensor 15 in the melt channel, i.e. the melt pressure itself. This measurement pressure curve $p_m$ can be forwarded to the pattern determining unit 23b, which determines a measurement event pattern $M_m$ from the measurement pressure curve $p_m$ in the same manner, for example by means of differentiation and slope analysis as described above for the simulated pressure curve $p_S$. Both pattern determining units 23a, 23b can be realised as a common pattern determining unit that is simply fed with the appropriate input data $p_S$, $p_m$ and which delivers the corresponding event pattern $M_S$, $M_m$.

The interfaces 21, 24 may also receive the information for example via a conventional interface 19 of the control arrangement 18, over which an external data transfer is possible to other processor units, memories, etc., and which itself can also receive data from sensors 11, 15 of the injection moulding arrangement.

Measurement of the measurement pressure curve $p_m$ with the aid of control arrangement 18 is shown as block 1.VI in FIG. 1. The measurement pressure curve $p_m$ obtained therewith can then optionally be corrected in stage 1.VII, for example if the volumetric flow was not kept constant during the measurement but was adjusted according to a certain control rule. With information regarding the adjustment of the volumetric flow, it is possible to carry out a conversion into a time-corrected measurement pressure curve $p_{mk}$ that would correspond to a measurement pressure curve at constant volumetric flow. To generate the measurement pressure curve $p_m$ (or the time-corrected measurement pressure curve $p_{mk}$) from the individual values of pressure over time, the process parameter values can also comprise a separate additional pressure curve determining unit (not shown). Generally, these pressure curves can also have been computed in a different part of the control arrangement and can have been provided as complete pressure curves over interface 24.

In stage 1.VIII, the measurement event pattern $M_m$ is then generated on the basis of the measurement pressure curve or optionally the time-corrected measurement pressure curve. This is done in the pattern determining unit 23b.

Both the part-specific event pattern $M_S$ and the measurement event pattern $M_m$ are then forwarded to an assigning unit 25, which for example carries out stage 1.IX (see FIG. 1). Here, it is attempted to match the event patterns $M_S$, $M_m$ or at least parts thereof in order to match individual events of both event patterns $M_S$, $M_m$ to each other. Generally, it is attempted to assign the virtual events of the part-specific specific event pattern $M_S$ to the measurement events of the measurement event pattern $M_m$ as will be explained below.

Once the events have been assigned to each other, the melt front position can be assigned to the respective events in a following stage 1.X. On the basis of the time instants at which these events occurred, the flow front rate can be determined in stage 1.XI and, finally, machine-independent values such as the shear rate can be computed in stage 1.XII. This will be explained below. All of these stages 1.X, 1.XI, 1.XII can be carried out for example in the analysis unit 26. The resulting information, in particular the process parameter value as a function of injection time and/or actuator position, can be forwarded from the analysis unit 26 to a display control arrangement 27 that controls the display arrangement 31 of the user interface 30 accordingly in order to show the process parameter values inside the injection mould, in particular the flow front position SF and/or the flow front rates. For those parameter settings of the injection moulding arrangement that lead to the best form part quality, it is expedient to save the machine-independent values and preferably also the other values such as flow front rates etc. as a reference list. This is indicated in stage 1.XIV. For example, all relevant values can also be entered as components of the event vector described above, and then stored as a set of characteristics. When the machine is changed, these components can serve as target values. The new setting values of the machine parameters such as volumetric flow progression and/or pressure progression can be determined through back-calculation, and the machine can be regulated accordingly.

In such regulation, in stage 1.XIII, the values determined during the previous injection moulding procedure in stage 1.XII are then compared to the reference list of characteristic values that was stored in stage 1.XIV, and corresponding control commands are then forwarded to the injection moulding arrangement or to its components that control the actuators.

The flow front speed $v_i$ of the melt can be calculated according to $$v_i = \frac{x_{Si+1} - x_{Si}}{t_{mi+1} - t_{mi}} \quad (4)$$

where $x_{Si}$ and $x_{Si+1}$ represent the position values of the $i^{th}$ and $(i+1)^{th}$ events, as known from the virtual events, and $t_{mi}$ and $t_{mi+1}$ are each the machine time at which the measurement event, assigned to the corresponding virtual event, occurred, i.e. the time at which the position was reached.

Equally, the mass pressure between two events can be determined as follows:

$$\Delta p_i = p_{mi+1} - p_{mi} \quad (5)$$

where $p_{mi}$ and $p_{mi+1}$ are the measured pressure values at times $t_{mi}$ and $t_{mi+1}$ of the $i^{th}$ or $(i+1)^{th}$ event.

Form these computed components of flow front velocity and mass pressure increase, machine-independent rheological values such as wall shear stress $\tau_i$, shear rate $\dot{\gamma}_i$ and melt viscosity $\eta_i$ can be derived. For example, for a rectangular flow canal cross-section, this can be done using the following equations:

$$\tau_i = \frac{\Delta p_i \cdot h_{Si}}{2 \cdot (x_{Si+1} - x_{Si})} \quad (6)$$

$$\dot{\gamma}_i = 0{,}722 \cdot \frac{6 \cdot v_i}{h_{Si}} \quad (7)$$

$$\eta_i = \frac{\Delta p_i \cdot h_{Si}^2}{12 \cdot (x_{Si+1} - x_{Si}) \cdot v_i} \quad (8)$$

where $h_{Si}$ is the flow channel height at position $x_{Si}$. For other geometries, similar equations apply, as will be known to the skilled person.

In conjunction with the inventive method, the injection moulding arrangement can be used as a rheometer that delivers rheological information to the event locations and between the event locations in real time.

To increase the accuracy of the method described above, preferably the position information and further information (such as components of the event vector) between two events $E_{m,i+j}$, $E_{m,i+j+1}$ are approximated analytically or numerically. If an FEM computation was carried out, a complete set of information, in particular components of the event vector, can be assigned to each node.

Saving the reference list can also be used to control the system if, during the injection moulding procedure, the operating conditions are affected by disturbances such as external temperature influences or altered material viscosity. In that case, the machine parameter settings can be corrected by appropriate regulatory measures by using the machine-independent rheological values described above as target values for the correction.

It shall be noted that all steps of the method shown in FIG. 1 can be carried out by the control unit 18 itself but need not be. In particular, the simulation or computation of the part-specific event pattern $M_S$ according to stages 1.I to 1.IV can be performed on a powerful external computer facility, while all other stages of the method are carried out for example by the control unit 18.

In the following, identification of a part-specific event pattern in a measurement pattern is explained again using the example of an injection moulding procedures for a form part 1' in the form of a stepped plate. The geometry of this stepped plate and the geometry of the gating system or gate channel are shown in the perspective view of FIG. 6. The three event locations $F_1$, $F_2$, $F_3$ or steps $F_1$, $F_2$, $F_3$ as well as the end $F_3$ of the form part are shown here again.

The form part is a three-stepped plate with a cross-section ratio at the steps of H1 (greatest height)=2×H2=4×H3 (smallest height H3=1 mm). The base area is 120×60 mm. The CAD-geometry was provided as a STEP file (.stp) and the FEM mesh was generated with Autodesk Moldflow. An element size of 1 mm was used in a 3D volume model with eight layers over the wall thickness. The gating system comprises a direct gate, shown pointing downwards in FIG. 6, as well as a dovetail at the largest cross-section. This gating system was included in the numerical analysis to compute the part-specific pressure curve. A tool temperature of 30° C. and a mass temperature of 250° C. were assumed in the computation; the volumetric flow was held constant at 15 cm³/s. It was assumed that the material was an ABS-Terluran GP-22. At 98% fill, a changeover to holding pressure was simulated.

Figure 7:
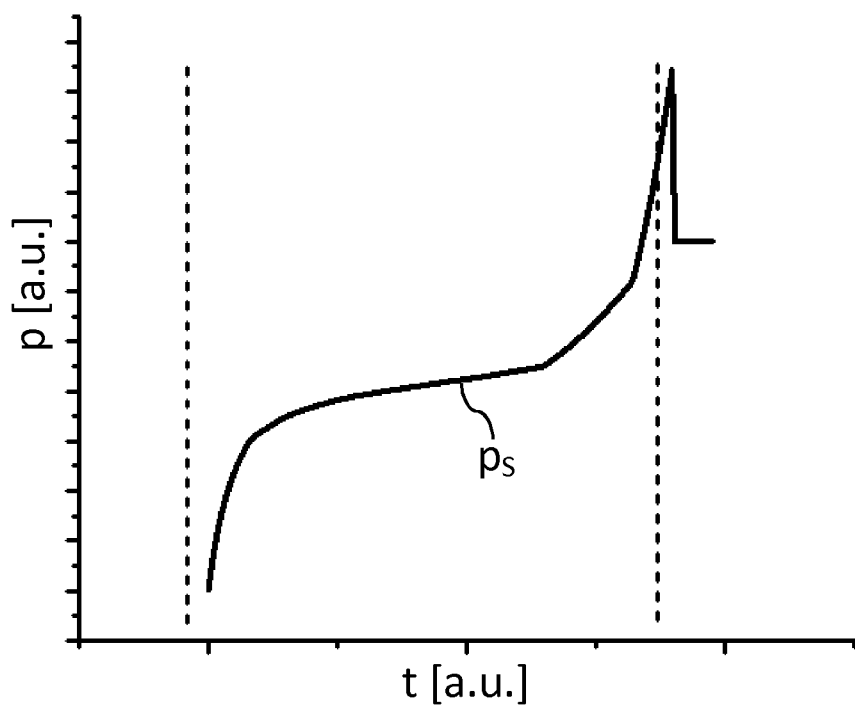
FIG. 7 shows a simulated pressure gradient for the moulded part of FIG. 6.

FIG. 7 shows the virtual or simulated pressure curve $p_S$ determined in this manner (here also, the graph is shown using arbitrary units). An interval bounded by the dashed lines indicates the part of the pressure curve $p_S$ that will actually be used in the subsequent analysis. It makes sense to only use a part of the pressure curve $p_S$, preferably the part towards the end of the form fill phase, i.e. up until when the melt front first reaches the flow path end of the cavity of the injection mould.

Figure 8:
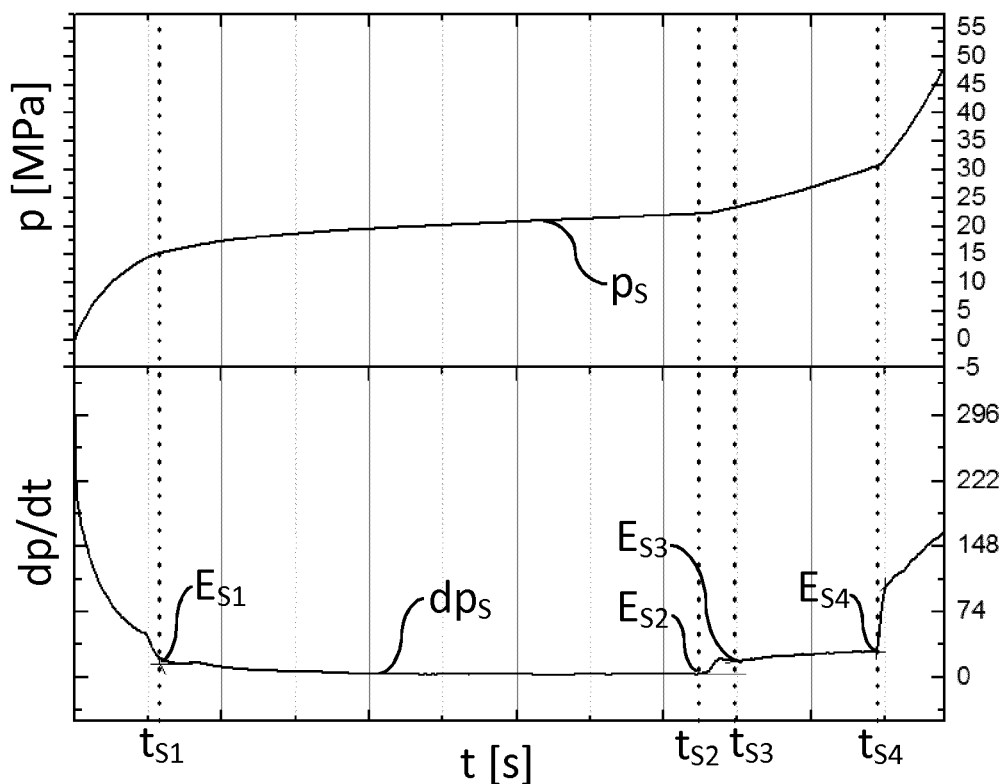
FIG. 8 shows the section of the simulated pressure gradient indicated in FIG. 7 (above) and the simulated pressure gradient differentiated over time.

FIG. 8 shows this section of the pressure curve $p_S$ in a diagram together with the differentiated pressure curve $dp_S$ in the lower part of the diagram. Time is indicated in s, and pressure in MPa. In the differentiated pressure curve $dp_S$ in the lower part of the diagram, the slope analysis is already indicated by the total of four significant events $E_{S1}$, $E_{S2}$, $E_{S3}$, $E_{S4}$ identified as occurring at four different times $t_{S1}$, $t_{S2}$, $t_{S3}$, $t_{S4}$. These times $t_{S1}$, $t_{S2}$, $t_{S3}$, $t_{S4}$ relate to the virtual progression of the injection moulding procedure as explained above. Should a real injection into this tool be carried out at a later time, and the measured pressure curve be differentiated in the same manner and undergo slope analysis, it should be possible to identify a matching pattern, whereby such a pattern would be characterised by a similar or essentially identical sequence of events with similar or essentially identical relative intervals, as long as the volumetric flow is kept constant during the measurement. Of course, it may also be the case that additional events appear in the pattern.

Figure 6:
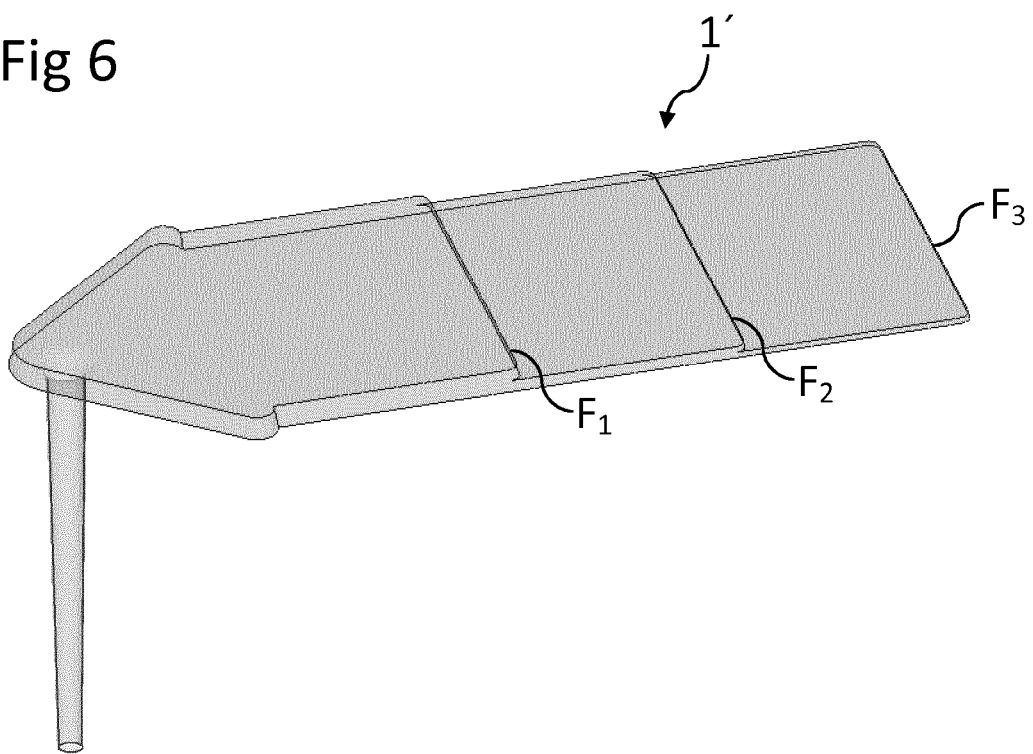
FIG. 6 shows a perspective view of a first moulded part in the form of a stepped plate with a gating system.
Figure 9:
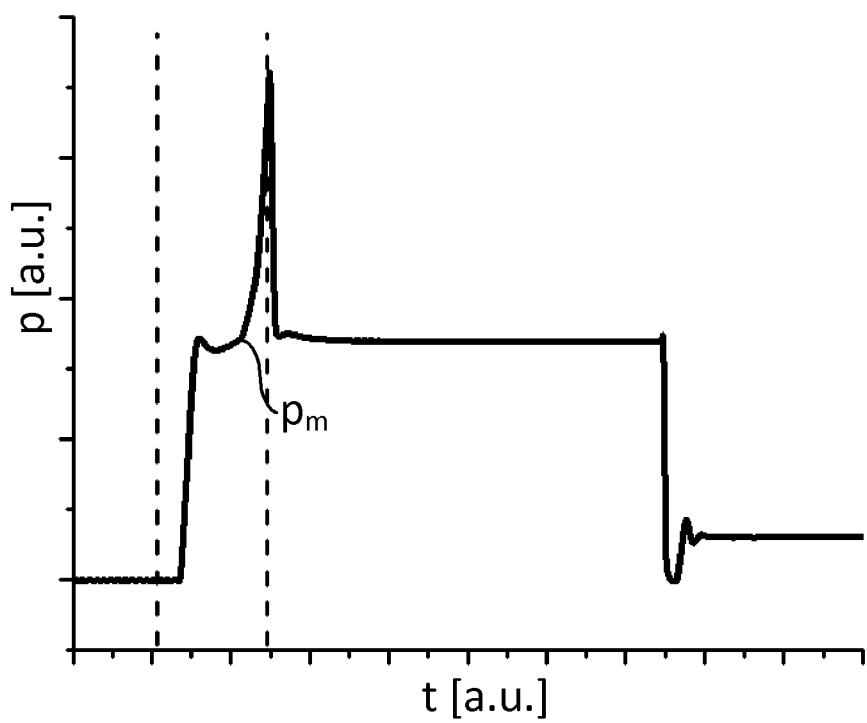
FIG. 9 shows a real measured pressure gradient for the moulded part of FIG. 6.

In order to test the inventive method, an injection moulding trial is then carried out, for which a form part is provided as shown in FIG. 6 with the very same gating system. For this injection moulding trial, an injection moulding arrangement of type Battenfeld HM 800 with 30 mm screw diameter was used. A speed-controlled injection with a constant volumetric flow of 15 cm³/s was carried out, i.e. in keeping with the preceding simulation. The parameter settings and the material were the same as in the simulation. The mass pressure measurement, i.e. the measurement of the pressure in the injection material was done using a mass pressure sensor arranged in the screw chamber, i.e. in the machine nozzle. The measurement pressure curve $p_m$ determined in this way is shown in FIG. 9 (again, in arbitrary units). The diagram also shows an interval that indicates the region of the pressure curve $p_m$ that will be used for the analysis.

Figure 10:
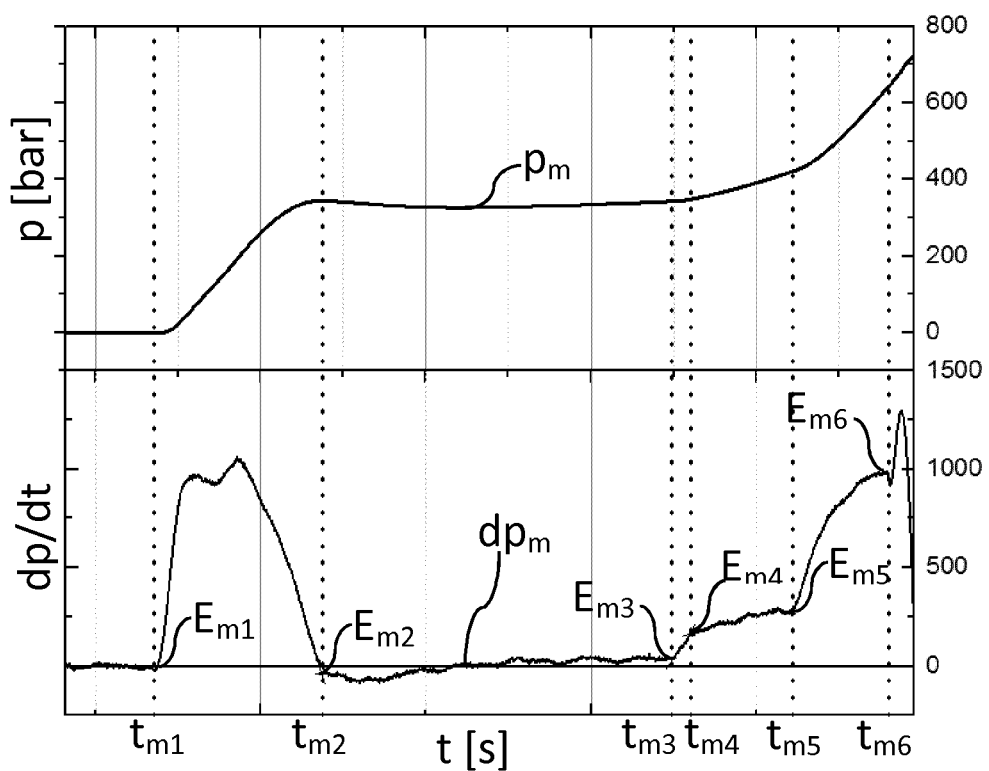
FIG. 10 shows the section of the smoothed measured pressure gradient indicated in FIG. 9 and the measured pressure gradient differentiated over time.

As in FIG. 8, the upper part of FIG. 10 shows a diagram of the measurement pressure curve $p_m$ for the simulated measurement and underneath, the measurement pressure curve differentiated over time $dp_m$. Machine pressure is given in bar, also for the first derivative, and time is indicated in s. A total of six events $E_{m1}$, $E_{m2}$, $E_{m3}$, $E_{m4}$, $E_{m5}$, $E_{m6}$ occur at times $t_{m1}$, $t_{m2}$, $t_{m3}$, $t_{m4}$, $t_{m5}$, $t_{m6}$.

Figure 11:
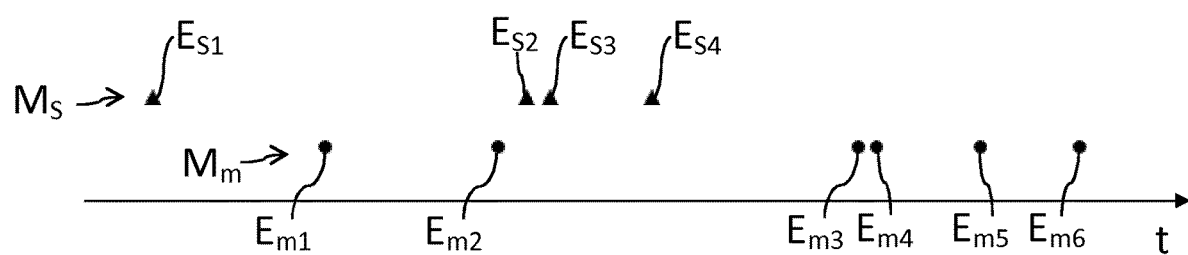
FIG. 11 shows a virtual event pattern from the analysis of the simulated pressure gradient of FIG. 8, and a measurement event pattern from the analysis of the measured pressure gradient of FIG. 10.

In FIG. 11 the part-specific event pattern $M_S$, determined as described in FIG. 8, and the measurement event pattern $M_m$, determined as described in FIG. 10 are shown as two rows of points, one above the other. As can be seen here, the part-specific event pattern $M_S$ has four events $E_{S1}$, $E_{S2}$, $E_{S3}$, $E_{S4}$ und and the measurement event pattern $M_m$ has six events $E_{m1}$, $E_{m2}$, $E_{m3}$, $E_{m4}$, $E_{m5}$, $E_{m6}$. These sets of points are arranged along the time axis t. The events occurred at different absolute times, but the part-specific event pattern $M_S$ should be identifiable in the measurement event pattern $M_m$ when the part-specific event pattern $M_S$ is scaled accordingly over time, i.e. distorted and offset.

Figure 12A:
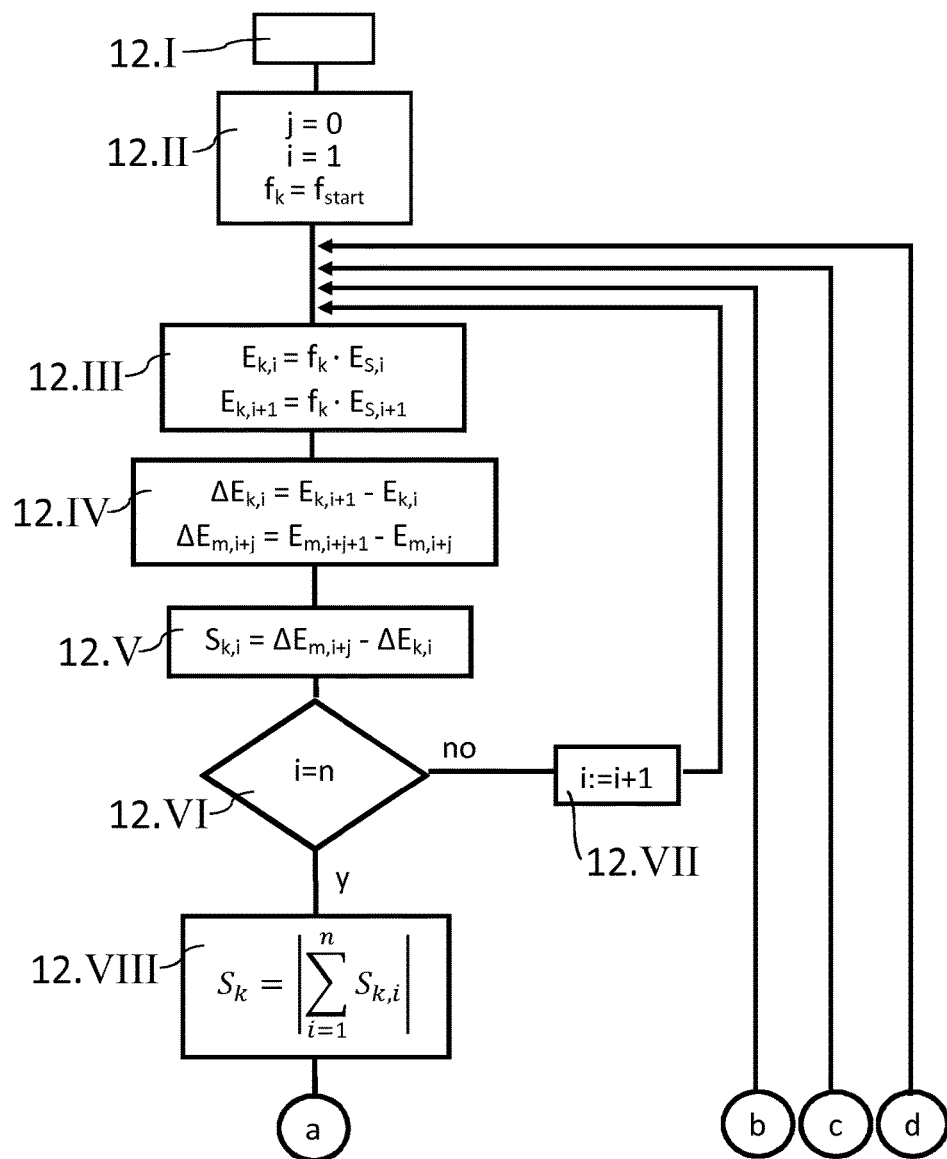
FIGS. 12a and 12b show an exemplary flow diagram for allocating events of a virtual event pattern to events of a measurement event pattern.
Figure 12B:
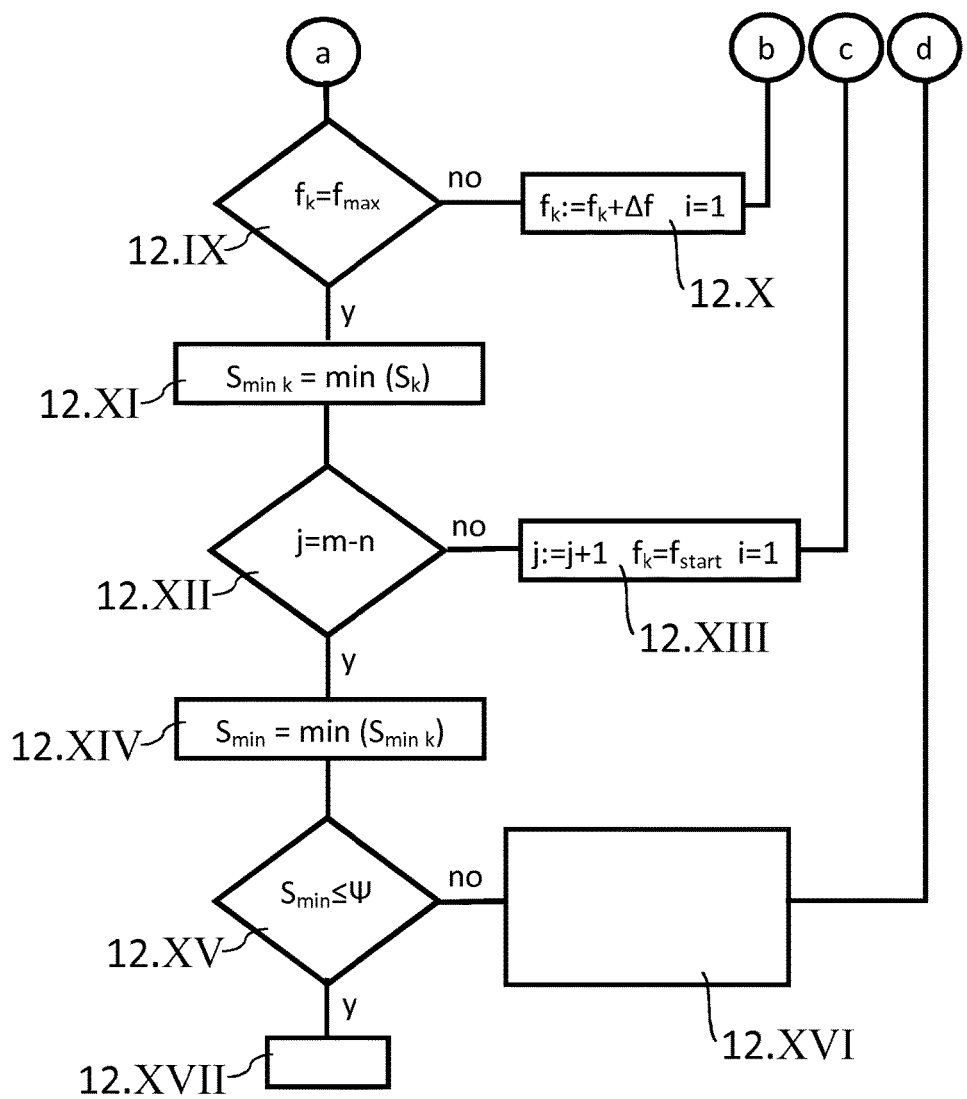

In this way, the simulated events of the part-specific event pattern $M_S$ can be assigned to certain measurement events of the measurement event pattern $M_m$, within predefined error bounds. A simple way of doing this is by linear analysis or an iterative matching method as explained in the following with the aid of the flow chart of FIGS. 12a, 12b (overview), whereby the connections between FIGS. 12a and 12b are indicated by the letters a, b, c, d.

The method starts in stage 12.I. In stage 12.II, variables j, i and $f_k$ are first initialised. Variable j is first set to 0. This variable may be regarded as an "offset index" that determines by how many events the part-specific event pattern $M_S$ is offset relative to the measurement event pattern $M_m$ in order to achieve an optimal fit. The control variable i used in the iteration is set to 1. Finally, a variable $f_k$, used as a scaling or extension factor that can change in in fixed increments (e.g. of 0.01) between a previously defined minimum value (e.g. 0.1) and maximum value (e.g. 10) is set to a start value $f_{start}$ (for example, the minimum value). This scaling factor $f_k$ indicates by how much the time axis of the part-specific event pattern $M_S$ is to be stretched or scaled relative to that of the measurement event pattern $M_m$.

In the context of the iterative method, multiple iteration loops are then made to run.

An inner loop that comprises stages 12.III to 12.VII relates to the control variable i, which runs from 1 to n, where n is the number of events of the part-specific event pattern $M_S$. For each temporal stretching, a new stretched pattern is computed in this loop from the part-specific event pattern, and an attempt is made to match this to the measurement event pattern.

To this end, two neighbouring virtual or simulated events $E_{S,i}$, $E_{S,i+1}$ of the part-specific event pattern are multiplied with the current scaling factor $f_k$ in stage 12.III. In stage 12.IV, the temporal difference between the scaled virtual events $E_{k,i}$, $E_{k,i+1}$ is calculated, and also the difference between the measurement events $E_{m,i+j}$, $E_{m,i+j+1}$. Here, i is the running index of the virtual event, and j is the index value by which the part-specific event pattern was already offset relative to the measurement event pattern in a higher-level loop (see stage 12.XIII). In the first pass with j=0, the indices of the simulated events and measurement events are therefore identical, i..e the part-specific event pattern is offset so that the first virtual event coincides with the first measurement event. With j=1, the part-specific event pattern can be offset so that the first virtual event coincides with the second measurement event, etc.

The deviation $S_{k,i}$ between the previously calculated time intervals in each of the part-specific event pattern and the measurement event pattern are then determined in stage 12.V. In stage 12.VI it is checked to see whether the loop has completed for all n events $E_{S,i}$, otherwise ("no" branch) the value of i is incremented by 1 in stage 12.VII and the inner loop makes another pass. If, for the current scaling factor $f_k$, all deviations $S_{k,i}$ have been calculated for the individual event intervals ("yes" branch), a total deviation $S_k$ is calculated in state 12.VIII according to $$S_k = \left| \sum_{i=1}^{n} S_{k,i} \right| \qquad (9)$$

It is then checked in stage 12.IX whether the maximum of the scaling factor $f_k$ has been reached. If not ("no" branch), the scaling factor $f_k$ is incremented by the amount $\Delta f$, and the entire loop makes another pass. Otherwise, ("y" branch) the smallest deviation value $S_{min,k}$ of the deviation values determined in the previous iterations is identified in stage 12.XI.

Since the number of simulated virtual events is often not the same as the number of measurement events, the event pattern is offset by one event using index j in a higher-level loop as explained above, and the scaling or stretching is carried out again in order to see whether this results in a better fit. In stage 12.XII it is checked whether all possible offsets j have been carried out, whereby m is the number of measurement events. If not ("no" branch), the value of j is raised by 1 in stage 12.XIII and the scaling factor $f_k$ is initialised to its start value $f_{start}$ and i is also reset to 1. Otherwise ("y" branch), the smallest deviation value $S_{min}$ of the deviation values $S_{min,k}$ determined in the previous iterations is identified again in stage 12.XIV.

It is then checked in stage 12.XV whether the total deviation $S_{min}$ is less than a predefined error bound ψ. If this is not the case ("no" branch), a single event is eliminated in stage 12.XVI, and the entire process is run again the outermost loop. In addition to an offset, it is also possible to eliminate one or more events, in particular events from the middle region of the event pattern, but also from the part-specific event pattern. It should be noted that an offset as described above is ultimately the same as eliminating the first or last events for the comparison, so that a further elimination may not be necessary. If it is necessary, the outer loop may run as often as needs be, whereby a different event or several different events are excluded each time, until the total deviation $S_{min}$ is ultimately less than the error bound ψ. In this case, the assignment method concludes in stage 12.XVII ("y" branch) and the respective events can be regarded as correctly assigned. If, after trying all possible combinations or after a certain number of passes and/or after a prescribed length of time, it has not been possible to achieve a total deviation $S_{min}$ that is less than the error bound, ty a warning can be issued to the user.

Figure 13:
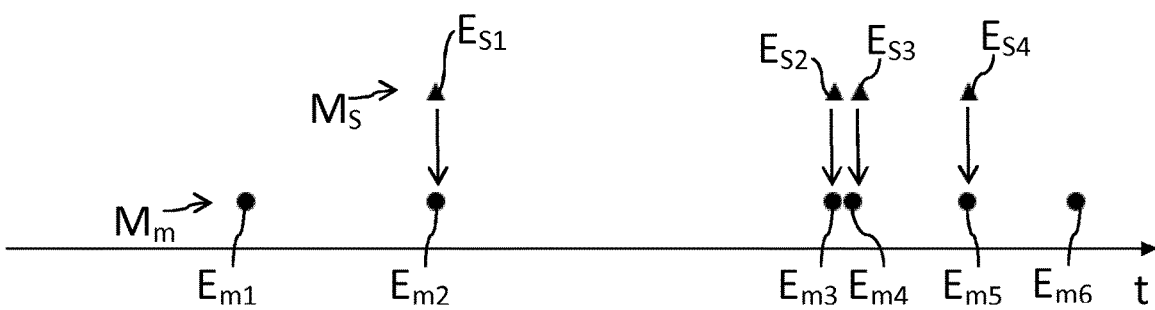
FIG. 13 shows the virtual event pattern and the measurement event pattern of FIG. 11 after allocation.

FIG. 13 shows this state for the measurement event pattern $M_m$ and the part-specific event pattern $M_S$ of FIG. 11. As can be seen here, the simulated events $E_{s,i}$ match the measured events $E_{m\ i+j}$ for j=1 within predefined error bounds ($E_{S1}$ corresponds to $E_{m2}$, $E_{S2}$ corresponds to Ems etc.). Further events can be seen at the beginning and end of the measurement event pattern $M_m$, because the range that was covered during the measurement was longer than the simulated range.

It shall be noted that, in addition or as an alternative, the measurement event pattern can also be temporally scaled and/or offset instead of the part-specific virtual event pattern, or that individual events can be eliminated from the virtual event pattern.

Figure 14:
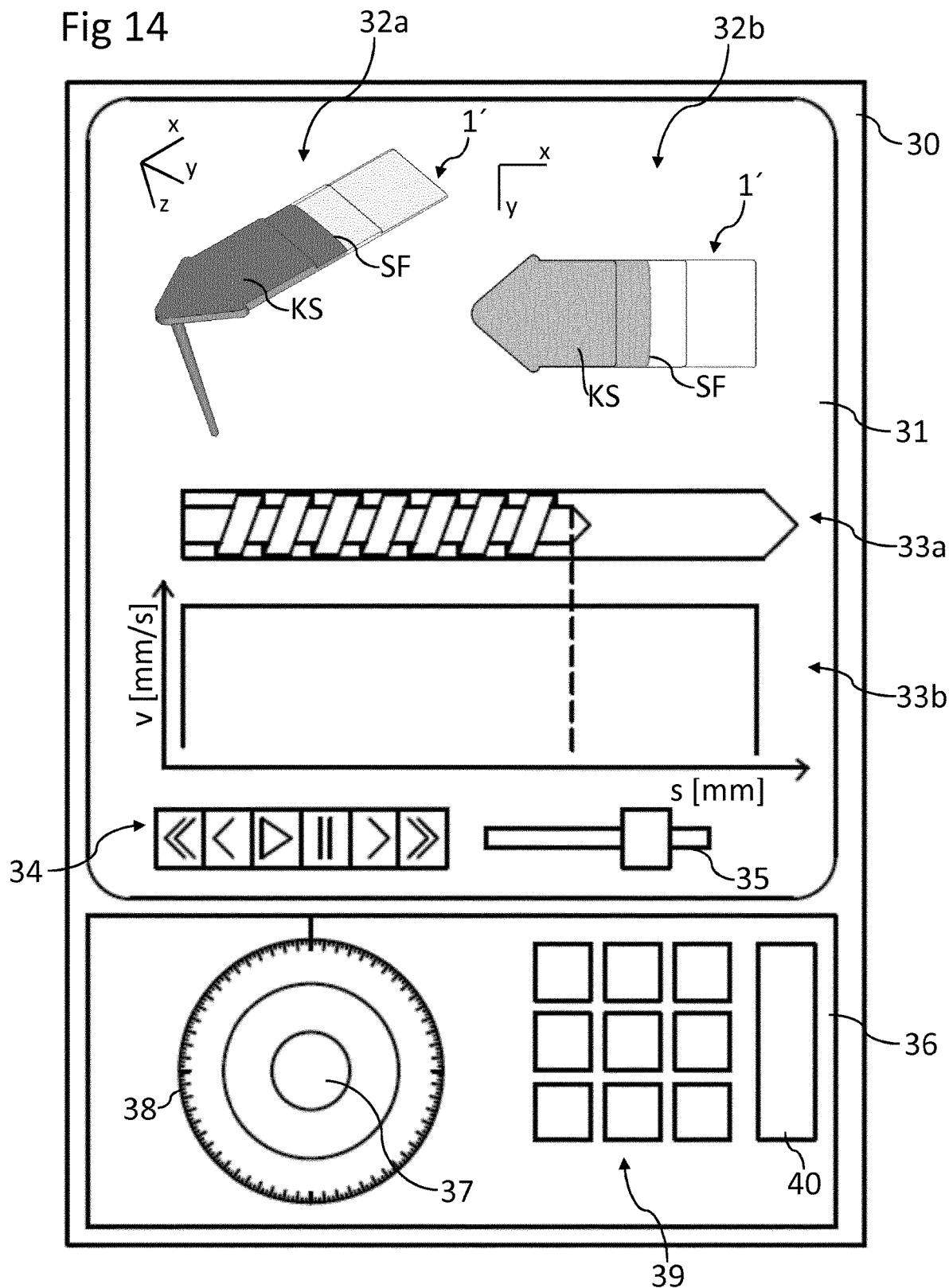
FIG. 14 is a schematic representation of a user interface with visualisation of a flow front in the moulded part of FIG. 6 and, underneath, a representation of the injection rate function used in the injection process.

FIG. 14 shows how the position of the melt front SF of the polymer melt KS can be visualized in the form part 1' or in the cavity of the injection mould 1' on a display arrangement 31. This is fairly straightforward, since it is known from the inventive method when the melt front or flow front SF reaches the individual event locations, and since the determined flow front rate makes it possible to calculate at which time the flow front reaches which point between event locations.

To this end, as shown in FIG. 14, the form part 1' can be shown in a suitable, for example transparent, rendering within which the progression of the melt can be visualised.

FIG. 14 shows an example of a terminal 30 or user interface 30 of the injection moulding machine, which, in addition to a display 31, shown here in the form of a touch display, also comprises a control panel 36 with mechanical control elements 37, 38, 39, 40. Here, in two upper adjacent display regions 32a, 32b in the touch display 31, the position of the flow front of the polymer melt is visualized in the form part 1', whereby different views are possible. In this way, in the upper left of display region 32a in FIG. 14, the virtual form part 1' is shown with the progression of the flow front SF visualized on the inside in perspective, and as a plan view from above in the display region 32b on the right. Preferably, the user can also rotate and tilt the view by touching the display in the relevant area. The different display regions 32a, 32b can also serve to show the progression of the polymer melt KS in form part 1' under different conditions, as will be explained below.

Underneath this virtual representation of the progression of the polymer melt KS in form part 1' there are further display regions 33a, 33b. Display region 33b shows, as an example, a diagram of a process control parameters, in this case the injection speed v (in mm/s) or the feed rate of the actuator or screw 14 above the actuator position s (in mm). In the display region 33a above, the position of the screw within the cylinder is visualized again.

Underneath the display region 33b with its diagram, there are further virtual control elements 34, 35, in this case a control panel 34 on the left in order to control the dynamic visualization of the injection moulding procedure or the form fill. As explained above, presentation of the form fill is preferably done in the form of an animation, e.g. a video or a slide show. Control panel 34 has suitable control elements to stop the animation, to re-start it, to play slowly forwards or backwards, or to play quickly forwards or backwards. A virtual slide control 35 is beside this, which can be used to quickly skip to a position of the melt front. Preferably, it is possible for the user to also change the feed rate v as a function of actuator position s with the aid of the diagram in display region 33b. This would be possible with a touchscreen, since the user could simply adjust the graph with a fingertip. Alternatively, further controllers, in particular virtual controllers or similar could be provided to allow a more precise setting at the relevant actuator position in order to adjust the function. The function that has been changed in this way is then no longer the function that was used during the previous injection moulding procedure or the simulated injection moulding procedure that is being visualized, but is instead a "desired function", which may be stored as a process control parameter function for a following injection moulding procedure. This will be explained below with the aid of FIGS. 23 and 24.

Another way of adjusting the position of the visualised flow front SF as precisely as possible in order to vary a process control parameter at that point, is provided by mechanical control elements of the control panel 36. These include a rotary adjuster 38 in the form of a wheel, with which a very accurate adjustment is possible, and with which the melt front SF can be adjusted frame by frame. A push button 37 is located in the centre of this rotary adjuster 38. If this is pressed, the position can be frozen at this point, for example. Of course, a different function can be assigned to such a push button 37.

A keyboard 39 is arranged along the side. Preferably, this is a numerical keyboard so that numbers can be entered. This keyboard also has a kind of enter key 40. This can be given the function of entering a process control parameter function, for example the previously set function for the injection rate v with respect to actuator position s for controlling a subsequent injection moulding procedure, i.e. this function will be saved as a target function.

Figure 15:
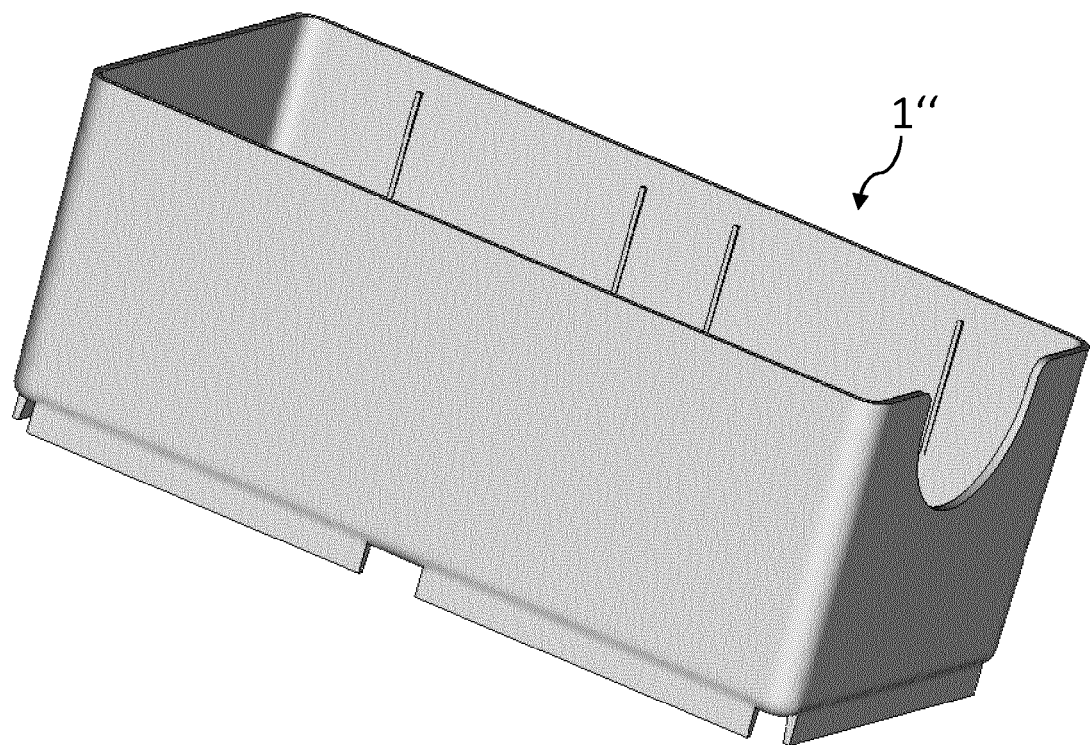
FIG. 15 shows a perspective view of a first moulded part in the form of a stackable block.

FIG. 15 shows a further form part 1" with which the inventive method was tested in a further trial.

Form part 1" in this case is a stackable box with a constant wall thickness of 1.5 mm. The footprint area is 160×75 mm. Here also, Autodesk Moldflow was used to generate an FEM mesh, whereby an element size of 1.5 mm in a 3D volume model with four layers over wall thickness was assumed. The entire CAD geometry was provided as a STEP file (.stp). This stacking box was injected centrally on its underside through a direct gate. The gating system was not part of the numerical analysis or simulation. In this case also, the simulation data for the FEM computation used a tool temperature of 30° C., a mass temperature of 250° C., a volumetric flow of 25 cm$^3$/s and ABS-Terluran GP-22 as material. The simulated switchover to holding pressure took place here also at 98% fill.

Figure 16:
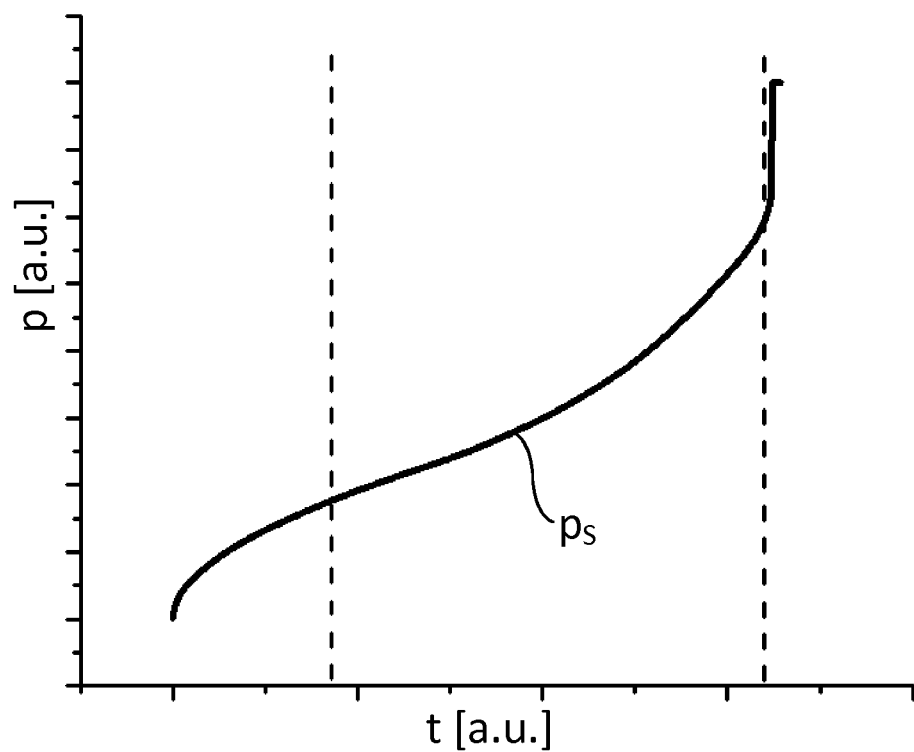
FIG. 16 shows a simulated pressure gradient for the moulded part of FIG. 15.
Figure 17:
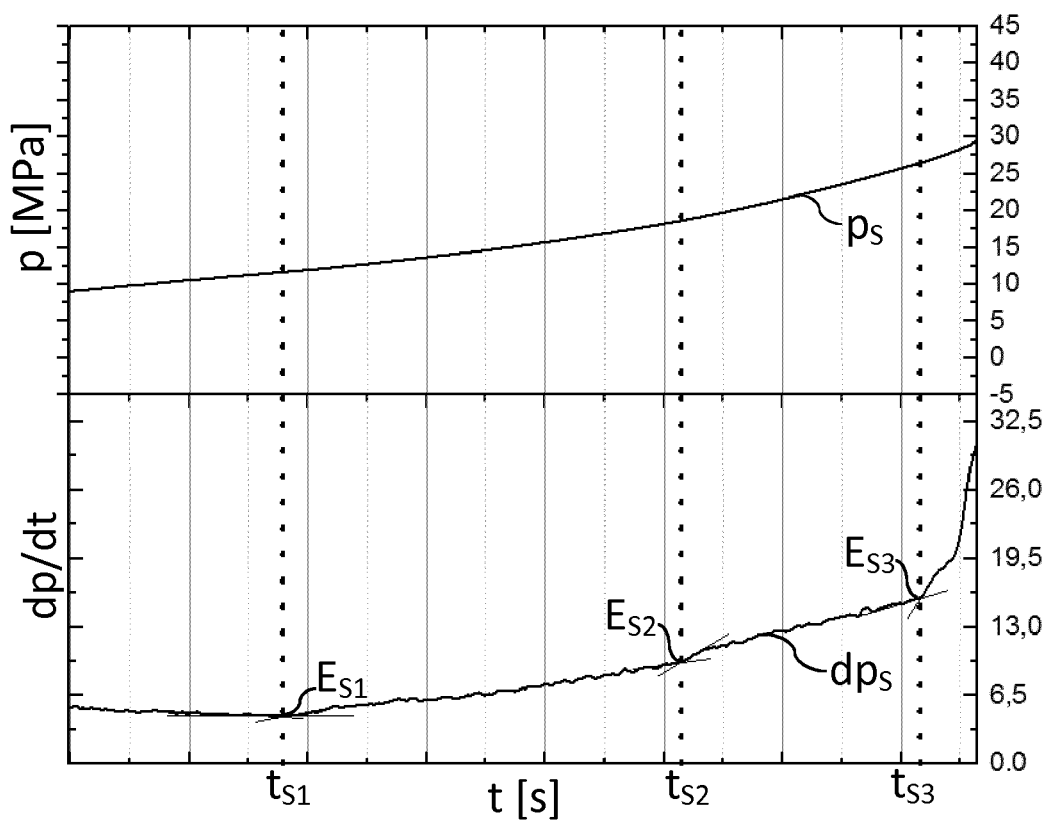
FIG. 17 shows the part of the simulated pressure gradient indicated in FIG. 16 and the simulated pressure gradient differentiated over time.

FIG. 16 shows a mass pressure curve numerically computed or simulated with the inventive method, and the region selected for later analysis is indicated by the dashed lines. FIG. 17 shows this selected part of the simulated pressure curve (upper part) and, underneath, the pressure curve differentiated over time, with a slope analysis. Here, three significant events $E_{S1}$, $E_{S2}$, $E_{S3}$ were identified.

A real trial injection moulding procedure was then carried out, using the same injection moulding arrangement that was used for the first experiment using the stepped plate. In this case also, a speed-controlled injection with a volumetric flow of 25 cm$^3$/s was carried out in keeping with the simulation, and the same parameter settings were chosen as for the virtual injection.

Figure 18:
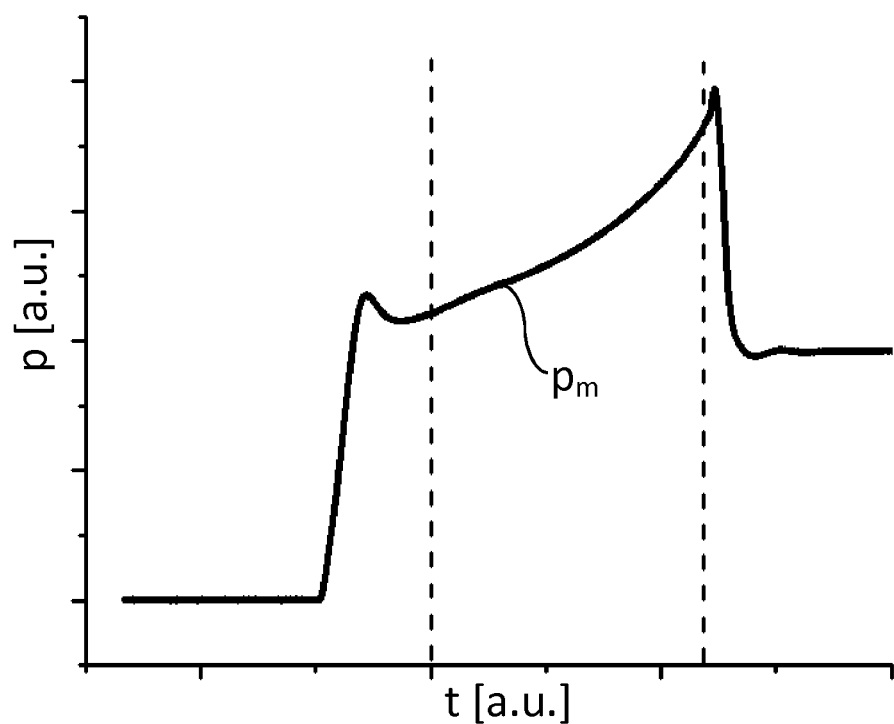
FIG. 18 shows a real measured pressure gradient for the moulded part of FIG. 15.
Figure 19:
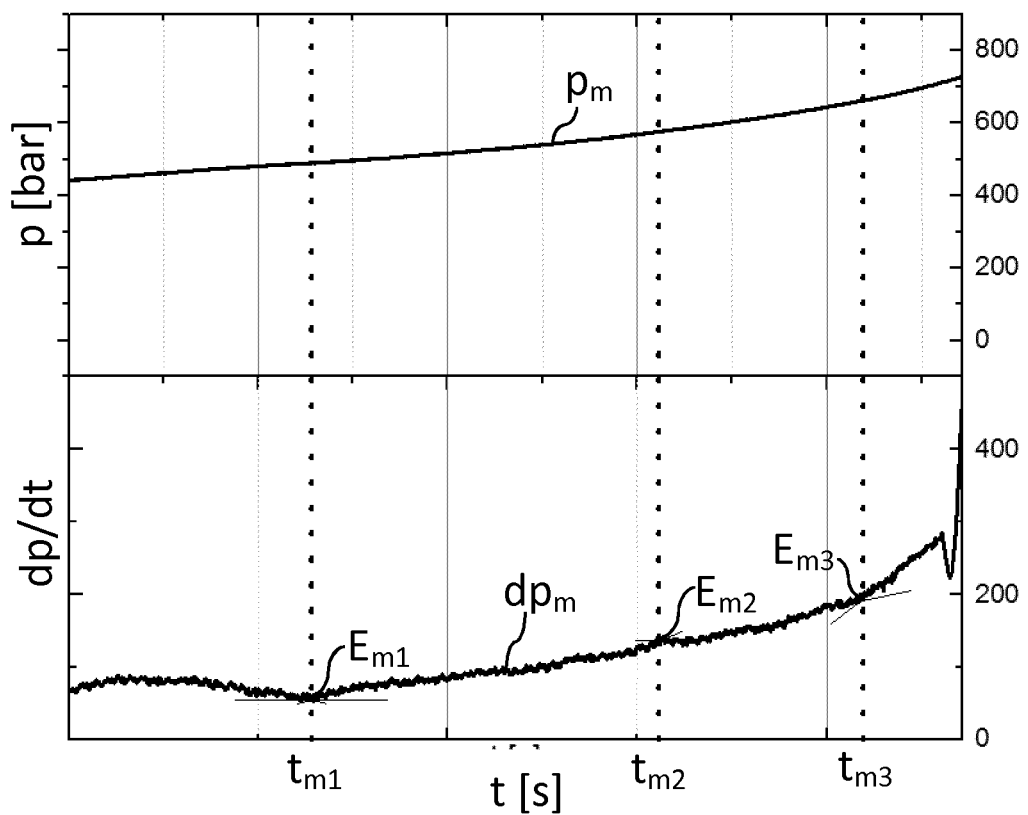
FIG. 19 shows the part of the (smoothed) measured pressure gradient indicated in FIG. 18 and the measured pressure gradient differentiated over time.

FIG. 18 shows the determined pressure curve, again with the region for later analysis indicated between the dashed lines, and FIG. 19 shows this selected part of the simulated pressure curve (upper part) and, underneath, the pressure curve differentiated over time, with a slope analysis. As in the simulation, the slope analysis led to the identification of three events $E_{m1}$, $E_{m2}$, $E_{m3}$.

Figure 20:
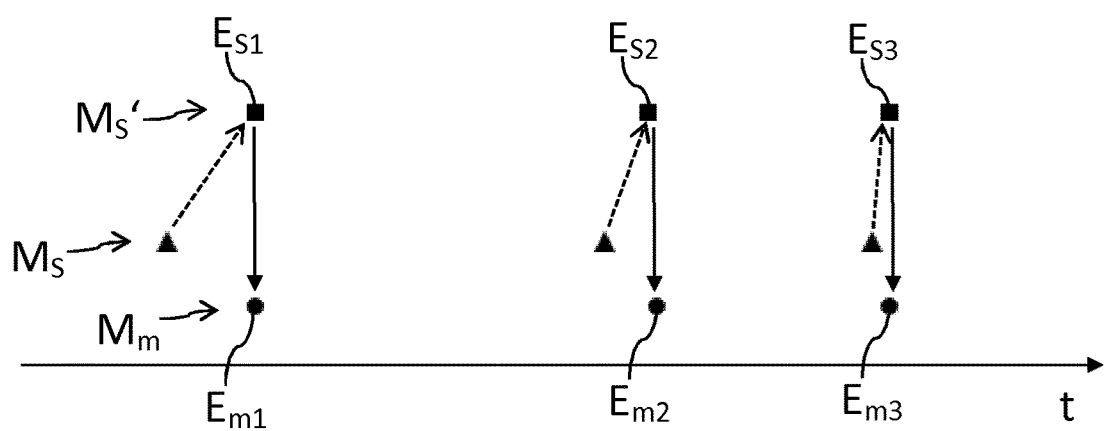
FIG. 20 shows a virtual event pattern from the analysis of the virtual pressure gradient of FIG. 17 and a measurement event pattern from the analysis of the measured pressure gradient of FIG. 19, as well as the virtual event pattern after adaptation to the measurement event pattern.

In FIG. 20, the measurement event pattern $M_m$ (lower row) and the virtual part-specific event pattern $M_S$ (middle row) are shown again over time t. A part-specific event pattern $M_S'$ is shown in the uppermost row, generated from the original virtual part-specific event pattern $M_S$ by simply shifting it so that their first events overlap and by temporally scaling it with a scaling factor $f_k$=0.90 (with $f_{start}$=0.1 and scaling increment $\Delta f$=0.01) to give the least deviation. This demonstrates how the virtual events of the part-specific event pattern $M_S$ can be assigned to the measurement events of the measurement event pattern $M_m$ within the predefined error bounds.

From the assigned events, it was possible to again determine the arrival of the melt front at the specific event locations in part 1" and also, from this, the flow front velocity of the melt front. With the aid of this information, it was then possible to visualise the entire injection procedure with respect to the machine time or injection time and/or the actuator position.

Figure 21:
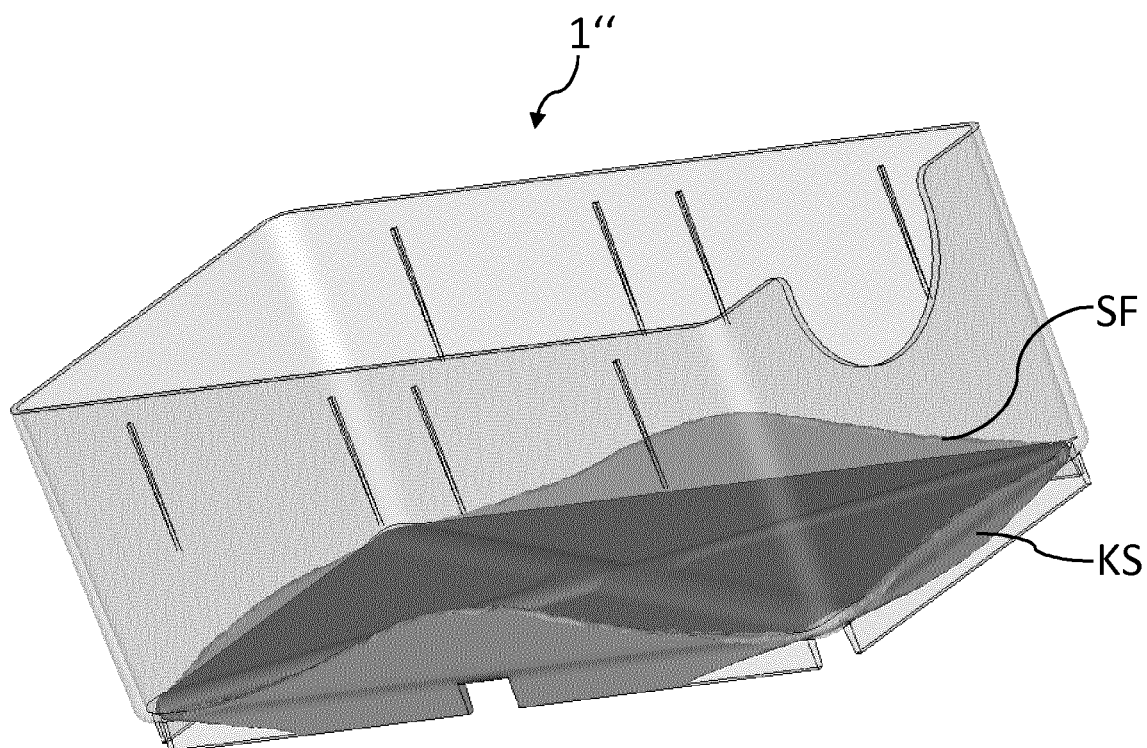
FIG. 21 is a schematic visualisation of a flow front in the moulded part of FIG. 15 at a first event location.
Figure 22:
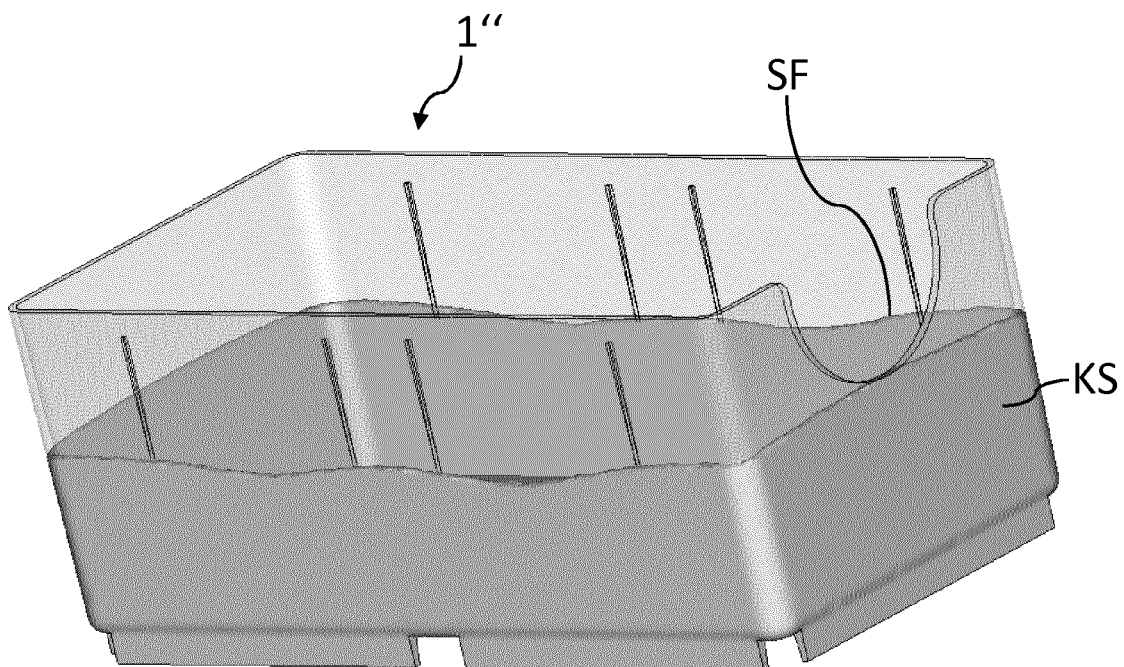
FIG. 22 is a schematic visualisation of a flow front in the moulded part of FIG. 15 at a second event location.

Two sample images are shown in FIGS. 21 and 22. FIG. 21 shows the arrival of the melt front at the first measurement event location. This is the case when the melt front reaches the downward-projecting wall sections at the underside of the stackable block. FIG. 22 shows the arrival of the melt front at the second measurement event location, namely when the melt front reaches the concave shape at one of the narrow end faces of the block. At this time also, there is a significant change in the pressure gradient.

These visualizations clearly demonstrate how the form filling (melt position) can be shown with the aid of the inventive method as a function of the machine time or injection time and/or actuator position and that the determined process parameter values and visualizations can also be used to optimize injection moulding procedures quicker than has been possible to date.

Figure 23:
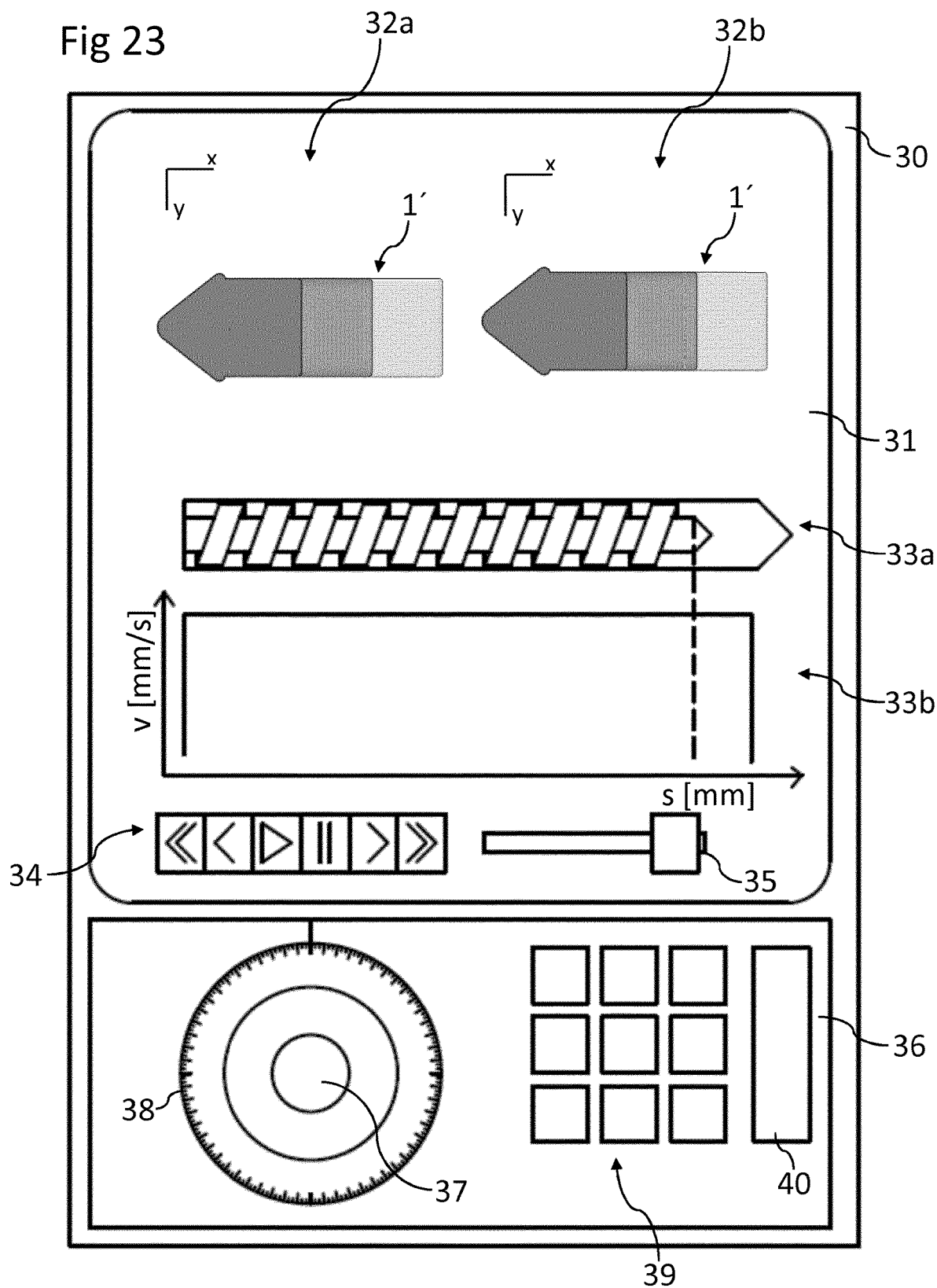
FIG. 23 is a schematic representation of the user interface of FIG. 14 with a visualisation of the flow front rate in the moulded part of FIG. 6 and, below, a representation of the injection rate function used in the injection process.
Figure 24:
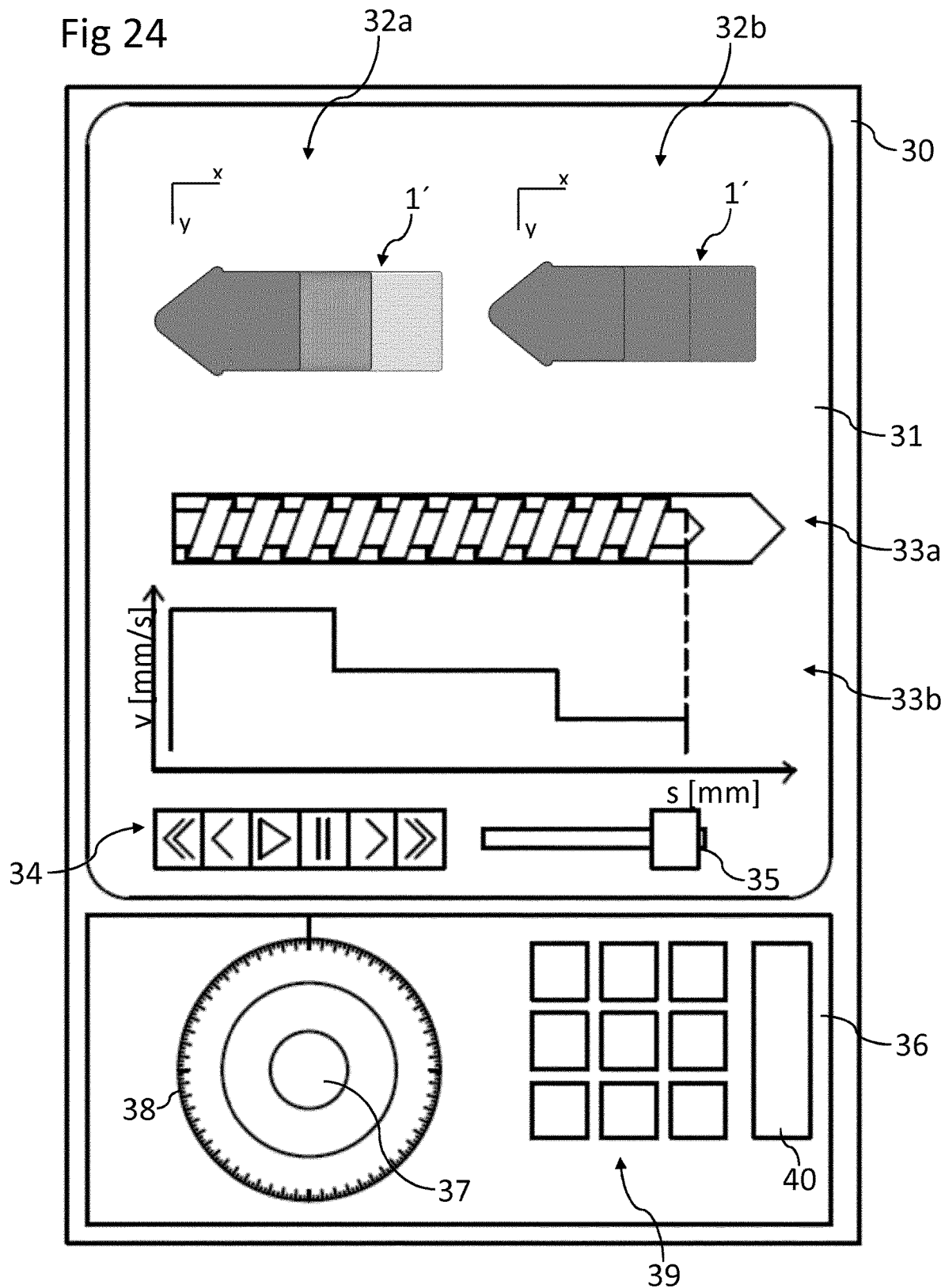
FIG. 24 is a schematic representation of the user interface with a visualisation of the flow front rate in the moulded part, similar to FIG. 23, but with an altered proposal for the injection rate function.

Using the example of FIG. 14 and the following FIGS. 23 and 24, it will be shown again how a rapid optimisation of the injection moulding procedure is possible with the aid of the visualization. These diagrams show the terminal 30 and display 31 with the visualization of the form fill in the simple injection mould 1' of FIG. 6. Display regions 32a, 32b, 33a, 33b in display 31 are used in the same manner as the example of FIG. 14. The screen 31 also exhibits the same controls 34, 35. The control panel 36 is also configured in the same way with mechanical controls.

In this case, however, the user has configured the virtual representation of the injection mould 1' in display area 32a so that it also shows the injection mould from above. Furthermore, the different melt front flow rates or flow front rates inside the virtual form part 1' are indicated using various shades of grey. As can be seen clearly here, when the form part has different wall thicknesses, the flow front rate increases whenever the melt front passes a thinner form part wall thickness in the injection mould, since the feed rate v of the screw is constant as a function of the screw position s, and the volumetric flow is also constant, as shown in the diagram in display region 33b. However, this is not necessarily desirable. One possible optimization strategy in configuring the process might be to have a constant flow front rate over the entire flow path.

To this end, with the aid of the diagram in display region 33b and the controls of the control panel 36, the user can reduce the feed rate v at precisely defined actuator positions that precisely correspond to the positons at which the flow front reaches a new section inside the injection mould or the form part 1' (i.e. at the event locations). Subsequently, with this predefined feed rate function as shown in display region 33b in FIG. 24, the user can initially carry out a simulation of the injection mould process. The result of this simulation or numerical calculation can be shown in display region 32b so that a precise comparison of the results of the previous injection moulding procedure and the expected new injection moulding procedure can be visualized (see FIG. 24).

The user can therefore immediately see that the flow front rate will now be constant in the entire form part 1', as can be seen by the homogenous grey representation. The user can then press the enter button 40 on the control panel 36 to apply the configured process control parameter function as shown in the display region 33b, i.e. the optimised feed flow rate function v dependent on screw position s, and to carry out the next injection moulding procedure.

An optimisation—for example setting an as constant as possible flow front rate over the entire flow path—can also be done automatically. To this end, an algorithm can compute the corresponding velocity profile of the actuator (injection rate profile), for example as a function of a predefined constant flow front rate, and control of the actuator can be effected according to the computed injection rate profile. Here also, the user can select the automatic computation by the press of a button.

In the preferred embodiments described above, special measurement arrangements within the cavity of the injection mould were not required, since the flow front position within the form part, and therefore also all other desired process parameter values, were neatly determined with the aid of the event pattern.

It shall be pointed out that the devices described in detail above are exemplary embodiments that can be modified by the skilled person in various ways without departing from the scope of the invention. In particular, although injection moulds and tools with one cavity have been described herein, the invention can be used in the same or similar way with injection moulds that have multiple cavities (each for a form part), which may be linked by a shared injection duct. In the case of identical cavities, it can be sufficient to carry out the simulation for one single cavity in order to determine a characteristic part-specific event pattern for the tool in question, which can later be assigned to a measurement event pattern. The configuration of which parameters to be visualised is also arbitrary. For example, it is possible (as explained in detail above) to visualise the process parameters of viscosity and/or shear velocity and/or shear force on or in the form part, which can be calculated from melt front speed and pressure increase between the event locations, e.g. to show these in display region 32a or as a preview in display region 32b. Furthermore, use of the indefinite articles "a" or "an" do not exclude the possibility or multiple instances of the feature in question. Equally, the terms "unit" and "module" do not exclude the possibility that these may comprise several, possibly even separate subunits.

The invention claimed is:

1. A method of determining a number of process parameter values within an injection mould during an injection moulding process, the method comprising:
   determining geometric data of the injection mould and/or of a form part to be manufactured in the injection mould,
   determining a virtual part-specific pressure curve of an injection moulding process on the basis of the geometric data,
   determining a part-specific event pattern on the basis of the virtual part-specific pressure curve, whereby the part-specific event pattern comprises a plurality of unique virtual events linked to characteristic event locations of the part geometry, to each of which is assigned at least one relative time information and/or virtual actuator position as well as at least one position datum, which defines a position of a melt front of the injection moulding material in a mould cavity of the injection mould, carrying out an injection moulding process using the injection mould and determining a measured pressure curve during the injection moulding process, determining a measurement event pattern in the mould cavity on the basis of the measured pressure curve, wherein the measured pressure curve comprises a plurality of unique measurement events in the mould cavity, to each of which is assigned at least one time information and/or actuator position, assigning virtual events of the part-specific event pattern to measurement events of the measurement event pattern in the mould cavity, and deriving process parameter values on the basis of the position data assigned to the virtual events and on the basis of the time information and/or actuator positions assigned to the measurement events in the mould cavity that were matched to these virtual events.

2. The method according to claim 1, wherein, in the case of a variable volumetric flow during the injection moulding procedure, a measured pressure curve determined therein is converted to a time-corrected measurement pressure curve, on the basis of which the measurement event pattern is determined.

3. The method according to claim 1, wherein the virtual events of the characteristic event pattern are determined on the basis of the temporal change of the slope of the virtual part-specific pressure curve and/or wherein the measurement events of the measurement event pattern are determined on the basis of the temporal change of the slope of the measurement pressure curve.

4. The method according to claim 3, wherein the part-specific pressure curve and/or the measurement pressure curve are differentiated over time and the virtual events or measurement events are determined with the aid of a slope analysis.

5. The method according to claim 1, wherein, in order to determine the measurement event pattern a plurality of measurement events are determined between the instant of entry in a form part interface of the form part and an end of a form fill phase of the injection mould.

6. The method according to claim 1, wherein the determining the measurement pressure curve is carried out during the injection moulding procedure by evaluating measurement values and/or settings external to the injection mould.

7. The method according to claim 1, wherein the virtual part-specific pressure curve is determined by applying an FEM simulation and/or numerical computation.

8. The method according to claim 1, wherein a method of pattern recognition is applied in order to assign virtual events of the part-specific event pattern to measurement events of the measurement event pattern.

9. The method according to claim 1, wherein, in order to assign virtual events of the part-specific event pattern to measurement events of the measurement event pattern, the part-specific event pattern and the measurement event pattern are overlaid at least partially in an iterative process, and wherein the part-specific event pattern and/or the measurement event pattern are temporally scaled and/or the part-specific event pattern and/or the measurement event pattern are shifted relative to each other and/or virtual events of the part-specific event pattern and/or measurement events of the measurement event pattern ($M_m$) are eliminated according to defined rules between different iteration steps.

10. The method according to claim 1, wherein a process parameter value to be determined comprises the position of the flow front as a function of the respective current injection time and/or an actuator position and/or a flow front rate in the form part.

11. The method according to claim 1, wherein the process parameter values comprise process parameter values including at least one of the following rheological values:

shear rate;

melt viscosity; and wall shear stress.

12. The method of controlling an injection moulding arrangement, wherein, using a method according to claim 1, at least a number of process parameter values are determined for a first injection moulding procedure with an injection mould, and the process parameter values are used as input values, in a control unit of the injection moulding arrangement for a further injection moulding procedure with that injection mould.

13. The method of visualizing an injection moulding procedure in an injection mould, wherein, with the aid of a method according to claim 1, at least the position of the flow front as a function of the respective current injection time and/or an actuator position is determined and shown inside a virtual injection mould and/or a virtual form part on a display arrangement.

14. A process parameter value determining apparatus for determining a number of process parameter values in an injection moulding procedure inside an injection mould, comprising a first interface for determining geometry data of the injection mould and/or a form part to be manufactured in the injection mould, a pressure gradient determining unit adapted to determine a virtual part-specific pressure gradient of an injection moulding procedure on the basis of the geometry data, a pattern determining unit adapted to determine a part-specific event pattern on the basis of the virtual part-specific pressure gradient, whereby the part-specific event pattern comprises a plurality of singular virtual events linked to characteristic event locations of the form part geometry, to each of which is assigned at least one relative time information and/or a virtual actuator position in addition to at least one position information that defines a position of a melt front of the injection material in a mould cavity of the injection mould, a second interface to acquire a measurement pressure gradient during an injection moulding procedure for an injection moulding arrangement using that injection mould, a pattern determining unit adapted to determine a measurement event pattern on the basis of the measurement pressure gradient, whereby the measurement event pattern comprises a plurality of singular measurement events in the mould cavity to which are assigned at least one time information and/or actuator position, an assignment unit adapted to assign virtual events of the part-specific event pattern to measurement events of the measurement event pattern in the mould cavity, an analysis unit adapted to derive process parameter values on the basis of the position data assigned to the virtual events and on the basis of the time information and/or actuator positions assigned to the measurement events in the mould cavity that were matched to these virtual events.

15. An injection moulding arrangement comprising an injection nozzle, an actuator to inject injection material from the nozzle into an injection mould connected to the injection moulding arrangement, a control arrangement to control the actuator and a process parameter value determining apparatus-according to claim 14.

16. The method according to claim 8, wherein a method of pattern recognition is an image recognition method.

17. The method according to claim 12, wherein the process parameter values are used as input values, which are target values.

* * * * *